(12) United States Patent
Magdelinic

(10) Patent No.: US 11,354,747 B2
(45) Date of Patent: Jun. 7, 2022

(54) REAL-TIME PREDICTIVE ANALYTICS ENGINE

(71) Applicant: OVERBOND LTD., Toronto (CA)

(72) Inventor: Vuk Magdelinic, Toronto (CA)

(73) Assignee: Overbond Ltd., Toronto (CA)

( * ) Notice: Subject to any disclaimer, the term of this patent is extended or adjusted under 35 U.S.C. 154(b) by 42 days.

(21) Appl. No.: 16/778,926

(22) Filed: Jan. 31, 2020

(65) Prior Publication Data
US 2020/0167869 A1 May 28, 2020

Related U.S. Application Data

(63) Continuation-in-part of application No. 15/488,721, filed on Apr. 17, 2017, now abandoned.

(60) Provisional application No. 62/323,673, filed on Apr. 16, 2016.

(51) Int. Cl.
*G06Q 40/06* (2012.01)
*G06K 9/62* (2022.01)
*G06Q 30/02* (2012.01)

(52) U.S. Cl.
CPC .......... *G06Q 40/06* (2013.01); *G06K 9/6256* (2013.01); *G06Q 30/0201* (2013.01); *G06Q 30/0206* (2013.01)

(58) Field of Classification Search
CPC .............. G06Q 40/06; G06Q 30/0201; G06Q 30/0206; G06K 9/6256
See application file for complete search history.

(56) References Cited

U.S. PATENT DOCUMENTS

| | | | | |
|---|---|---|---|---|
| 5,761,442 A | * | 6/1998 | Barr | G06N 3/0454 705/36 R |
| 6,347,307 B1 | * | 2/2002 | Sandhu | G06Q 40/00 705/36 R |
| 10,037,568 B2 | * | 7/2018 | Taylor | G06Q 40/06 |
| 2005/0203825 A1 | * | 9/2005 | Angle | G06Q 40/00 705/37 |
| 2006/0229963 A1 | * | 10/2006 | Creager | G06Q 40/06 705/35 |

(Continued)

OTHER PUBLICATIONS

Feuerriegel, Stefan and Ralph Fehrer. "Improving Decision Analytics with Deep Learning: the Case of Financial Disclosures." ECIS (2016). (Year: 2016).*

*Primary Examiner* — Bruce I Ebersman
*Assistant Examiner* — Steven R Chism
(74) *Attorney, Agent, or Firm* — Aird & McBurney LP

(57) ABSTRACT

A computerized end-to-end platform configured to receive and process financial market data in real-time, the end-to-end platform comprising: a computer system, the computer system comprising a host processor and host memory; a price analytics engine configured to minimize credit pricing risk and enabling systematic monitoring of credit pricing in a plurality of currencies; a predictive issuance analytics engine configured to systematically identify at least one fixed income market opportunity, wherein the at least one fixed income market opportunity comprises at least one financial instrument, and to provide pre-issuance insights into the fixed income market, and a matching and discovery engine configured to match at least one target institutional buyer with the fixed income market opportunity using a classifier trained on historical and contemporaneous data.

9 Claims, 36 Drawing Sheets

(56) References Cited

U.S. PATENT DOCUMENTS

| | | | |
|---|---|---|---|
| 2008/0177670 A1* | 7/2008 | Reid | G06Q 40/04 |
| | | | 705/36 R |
| 2008/0215477 A1* | 9/2008 | Annunziata | G06Q 40/04 |
| | | | 705/37 |
| 2009/0063322 A1* | 3/2009 | Billingsley | G06Q 40/04 |
| | | | 705/37 |
| 2011/0137821 A1* | 6/2011 | Mendelsohn | G06Q 10/067 |
| | | | 705/36 R |
| 2012/0284157 A1* | 11/2012 | Bienstock | G06Q 40/06 |
| | | | 705/35 |
| 2015/0088783 A1* | 3/2015 | Mun | G06Q 40/08 |
| | | | 705/36 R |
| 2016/0269378 A1* | 9/2016 | Ye | G06Q 40/06 |

* cited by examiner

113

| Maturity | 5-Year | 10-Year | 30-Year |
|---|---|---|---|
| Benchmark | 5-Year US Treasury | 10-Year US Treasury | 30-Year US Treasury |
| Benchmark Yield | 2.00% | 2.50% | 3.00% |
| Re-Offer Spread | +100 bps | +150 bps | +200 bps |
| Re-Offer Yield | 3.00% | 4.00% | 5.00% |
| Swapped Spread to US$LIBOR | L + 103 bps | L + 175 bps | L + 225 bps |

FIG. 14

REAL-TIME PREDICTIVE ANALYTICS ENGINE

CROSS-REFERENCE TO RELATED APPLICATIONS

This application is a continuation-in-part of U.S. patent application Ser. No. 15/488,721, filed on Apr. 17, 2017, the disclosure of which are incorporated herein by reference.

FIELD OF THE INVENTION

The present disclosure relates to computer-implemented methods for supporting multiple functions such as communication, information management, deal execution, stakeholder collaboration, pricing calculation, securities offering and issuance, and analytics for issuers, investors, and dealers.

DESCRIPTION OF THE RELATED ART

The primary market and the process of origination for securities has not changed for decades and is still a manual process that is paper heavy and includes phone calls and Microsoft Excel™ spreadsheets. For example, bond origination and over-the-counter (OTC) trading are in dire need for an improvement. The current fixed income capital market data flows are inefficient in many respects, limiting precision in assigning value to credit risk long term. Markets remain heavily reliant on segregated and manual data operations between counterparties and consequently, disparate data sets. These disparate data sets cause the market to suffer from information asymmetry and decentralization. As a result, insight from available data is fragmented and disseminated through manual exchanges between counterparties, which furthers creation of disparate data sets.

The existing process lacks transparency, is time consuming, and impedes the efficient allocation of capital. Since the 2008 financial crisis, increasingly stringent regulation has adversely impacted dealer's market-making capabilities in bond markets. When coupled with increasing new issuances driven by the low interest rate environment, there has been a sharp decline in secondary market trading activities, which in turn has exacerbated primary market challenges including inefficient new issue pricing and price discovery. In addition, the manual nature of the existing process makes the primary market inaccessible to many investors including some institutional and many retail investors. This is undesirable for a well-functioning capital market. Furthermore, because of these structural problems, many corporate issuers have a limited ability to raise capital in the institutional capital markets as they need to meet high size and scale requirements to justify costs and operational inefficiencies involved in the process.

Additionally, issuers, investors, and dealers exchange many disparate pieces of information and market analysis all in different formats and are each then consumed by cumbersome manual reviews. Market information tends to be point-in-time and is not useful in a market that changes every day.

Transparency during the sales process is also lacking, this includes transparency in pricing, costs, allocations, and supply and demand in general. Additionally, issuers do not have tools to prepare for new issue offerings or to manage relationships with their dealers and investor base. Vitally, dealers, issuers and investors do not have tools to gauge market interest between one another regarding potential offerings. All market participants also have limited ability to track activities involved in securities offerings for the purpose of regulatory and internal management reporting.

Transaction logistics in the primary market are phone call and email based. Time and financial resources lost to sending and receiving documents, aggregating and processing market information, regulatory compliance, performing manual credit research searching electronic mailboxes, making phone calls, and trying to contain information leakage is staggering. In addition, financial analysis is not real-time and does not help market participants make data driven decisions.

It is an object of the present disclosure to mitigate or obviate at least one of the above-mentioned disadvantages.

SUMMARY OF THE INVENTION

In another of its aspects, there is provided a computerized end-to-end platform configured to receive and process financial market data in real-time, the end-to-end platform comprising:

a computer system, the computer system comprising a host processor and host memory;

a price analytics engine configured to minimize credit pricing risk and enabling systematic monitoring of credit pricing in a plurality of currencies and monitoring the cost of swapping proceeds from a first currency to a second currency; wherein the price analytics engine is deployed on a member of the group consisting of a logic device, a processor unit, and a chip multi-processor;

a predictive issuance analytics engine configured to systematically identify at least one fixed income market opportunity, wherein the at least one fixed income market opportunity comprises at least one financial instrument, and to provide pre-issuance insights into the fixed income market, wherein the predictive issuance analytics engine is deployed on a member of the group consisting of the logic device, the processor unit, and the chip multi-processor;

a matching and discovery engine configured to match at least one target institutional buyer with the fixed income market opportunity, wherein the discovery engine is deployed on a member of the group consisting of the logic device, the processor unit, and the chip multi-processor;

a shared memory, wherein the shared memory includes memory space that is read/write addressable by the predictive issuance analytics engine, the price analytics engine and the discovery engine; and a peer-to-peer hardware interconnect configured to interconnect the predictive issuance analytics engine, the price analytics engine and the discovery engine via the shared memory; and wherein the host processor and the host memory are configured to process data received from the price analytics engine, the predictive issuance analytics engine, and the matching and discovery engine; and wherein the price analytics engine, the predictive issuance analytics engine, and the discovery engine are configured to write the normalized financial market data to the shared addressable memory space to thereby communicate at least a pricing of the at least one financial instrument, a time frame for an issuance of the at least one financial instrument, and an issuance propensity for the at least one financial instrument.

In another of its aspects, there is provided a computerized method for forecasting the pricing and timing of issuing at least one financial instrument, by integrating risk modeling, and risk analytics into a computing device comprising a processor and a memory comprising instructions executable by the processor to at least:

generating a user interface on a display of the computing device, said user interface comprising a plurality of user-selectable tabs comprising: a pricing tab, an issuance tab, and a matching tab, wherein a selection of said pricing tab causes a processor of said computing device to measure best-fit correlations with respect to a company's fundamental valuation and secondary market pricing for the company's at least one financial instrument across sector peers and market conditions and generate an at least one financial instrument pricing output, in real-time;

wherein a selection of said issuance tab causes the processor of said computing device to perform measurement of an at least one financial instrument issuer's propensity to issue the new bonds, and to assign a propensity score which estimates the relative likelihood the at least one financial instrument issuer will issue the at least one financial instrument within a predefined timeframe, and output an issuance recommendation for the at least one financial instrument issuer; and wherein a selection of said matching tab causes the processor of said computing device to employ algorithmic matching of target buyers with the at least one financial instrument, based on at least one of past buying patterns, portfolio manager preferences, rebalancing events and preferred industry sector, rating or tenor; and to generate a ranking score indicative of the target buyer's likelihood to purchase the at least one financial instrument.

In another of its aspects, there is provided a computerized method for forecasting the pricing and timing of issuing at least one financial instrument, by integrating risk modeling, and risk analytics into a computing device comprising a processor and a memory comprising instructions executable by the processor to at least:

generating a user interface on a display of the computing device, said user interface comprising a plurality of user-selectable tabs comprising: a pricing tab, an issuance tab, and a matching tab, wherein a selection of said pricing tab causes a processor of said computing device to measure best-fit correlations with respect to a company's fundamental valuation and secondary market pricing for the company's at least one financial instrument across sector peers and market conditions and generate an at least one financial instrument pricing output, in real-time;

wherein a selection of said issuance tab causes the processor of said computing device to perform measurement of an at least one financial instrument issuer's propensity to issue the new bonds, and to assign a propensity score which estimates the relative likelihood the at least one financial instrument issuer will issue the at least one financial instrument within a predefined timeframe, and output an issuance recommendation for the at least one financial instrument issuer; and wherein a selection of said matching tab causes the processor of said computing device to employ algorithmic matching of target buyers with the at least one financial instrument, based on at least one of past buying patterns, portfolio manager preferences, rebalancing events and preferred industry sector, rating or tenor; and to generate a ranking score indicative of the target buyer's likelihood to purchase the at least one financial instrument.

In another of its aspects, there is provided a program storage device readable by a computer, tangibly embodying a program of instructions executable by at least one computer to perform the steps in method, comprising:

aggregating raw data from a plurality of data sources comprising contemporaneous trading data and fundamental data covering a series of time periods and one or more aspects of quantitative investing and market monitoring, said raw data in a plurality of disparate formats;

transforming said raw data in the plurality of disparate formats to extract into a single standard format to generate structured data;

extracting at least one data element of value associated with at least one financial instrument from the structured data in accordance with one or more pre-programmed functions;

establishing a plurality of input nodes and an output node for a neural network model for each aspect of quantitative investing and market monitoring;

using a recurrent neural network to build at least one model;

inputting the structured data into the at least one recurrent neural network model using the plurality of input nodes;

training each of the at least one recurrent neural network using said inputs until an error function associated with an output value that corresponds to an aspect of quantitative investing and market monitoring is minimized; and using one or more weights from the trained at least one recurrent neural network models to identify a set structured data by element of value and output that will be used as an element of value summary for use as an input to each of one or more predictive models;

normalizing each of the one or more sets of structured data by data element of value, refining the sets of structured data by the data element of value, creating a summary of the refined transaction data set for each data element of value, and using the data element of value summaries as inputs to a predictive model for each of the one or more aspects of quantitative investing and market monitoring where the aspects of quantitative investing and market monitoring are selected from the group consisting managing trading activities, managing risk, making portfolio funding allocations, predicting a time horizon for issuance of the at least one financial instrument; predicting an issuer of the at least one financial instrument within the predicted time horizon; predicting a price of the at least one financial instrument, matching a buyer with the at least one financial instrument, and combinations thereof, and wherein the predictive models are useful for completing tasks selected from the group consisting of managing trading activities, managing risk, making portfolio funding allocations, predicting a time horizon for issuance of the at least one financial instrument; predicting an issuer of the at least one financial instrument within the predicted time horizon; predicting a price of the at least one financial instrument, matching a buyer with the at least one financial instrument, and combinations thereof.

In another of its aspects, there is provided a computer implemented method for trading in primary or secondary market offerings of securities on an interactive digital platform, the method comprising the steps of:

monitoring, by a programmed computer of the interactive digital platform, current and historical secondary market trading levels of correlated securities;

receiving, by the programmed computer, new issue pricing levels and secondary traded pricing levels from a plurality of dealers and capital market data sources, wherein the new issue pricing levels and secondary traded pricing levels are in a plurality of disparate formats;

converting, by the programmed computer, the plurality of disparate formats of the new issue pricing levels and secondary traded pricing levels into a standardized format;

responsive to said monitoring, predicting in real-time at least one of new issue likelihood, new issue pricing levels and secondary traded pricing levels of a plurality of issuers of the securities and the new issue pricing levels and secondary traded pricing levels of the securities;

converting, by the programmed computer, the new issue pricing levels and secondary traded pricing levels to equivalent levels in any one of a plurality of foreign currencies and any one of a plurality of interest rates;

matching, by the programmed computer, at least one target buyer to said specific issuers based on the at least one of the predicted new issue likelihood and the predicted new issue pricing levels and the predicted secondary traded pricing levels;

processing, by the programmed computer, new issue transactions following the matching step; and continuously monitoring, by the programmed computer, regulatory compliance and reporting mandates associated with the new issue transactions and secondary market trading transactions; and monitoring traditional and non-traditional buyer preferences, based on historical buying patterns of the traditional and non-traditional buyers and aggregating buyer preferences from expressions of interest aggregated from the computer program;

generating, by the programmed computer, regulatory or market monitoring reports related to deal and non-deal-related activities in the capital markets;

determining, by the programmed computer, in real-time current secondary market liquidity, using aggregate data derived from public data and proprietary private user data, and based on a predefined set of securities and a predefined group of dealers;

displaying, by the programmed computer, historical trend analysis charts, historical deal analysis charts, and sector and peer comparison charts based on the aggregate data.

In another of its aspects, there is provided an interactive digital platform for trading in primary market offerings of securities comprising a pre-deal activity module and a deal execution module. The pre-deal activity module is configured to allow a plurality of users to perform credit and market analysis, predictive analytics, communications functions, relationship management, and information management. The deal execution module is configured to allow the plurality of users to perform a deal execution workflow, order management, best execution analysis, documentation management, and regulatory compliance.

In another of its aspects, the credit and market analysis comprises publishing pricing levels to other users of the plurality of users using a common format, swap analysis, evaluation of secondary market liquidity, machine comparison of covenant terms, and evaluation of profiles of the plurality of users.

In another of its aspects, the predictive analytics comprises machine learning and big data, evaluating participation in primary markets, the evaluation of current and historic secondary market trading levels of correlated securities, and the prediction of new issue levels.

In another of its aspects, the communications functions comprise publishing pricing indications publicly or privately to other users of the plurality of users.

In another of its aspects, the relationship management comprises the tracking of historical records of deal participation by the plurality of users.

In another of its aspects, the information management comprises receiving a plurality of digitized primary market data from a plurality of sources, the platform digitizing the plurality of digitized primary market data, converting the plurality of digitized primary market data into a common format, and storing the plurality of primary market data into a database.

In another of its aspects, the deal execution workflow comprises enabling the plurality of users to create a plurality of deals and populate the plurality of deals with a plurality of existing reverse inquiries, soft sounding being used to gauge interest in the plurality of deals.

In another of its aspects, the order management comprises enabling the plurality of users to populate and allocate orders and submit orders for trading.

In another of its aspects, the best execution analysis comprises the utilization, by the platform, of bid and offer data to produce a weighting of pricing trends.

In another of its aspects, the documentation management comprises the indexing of the plurality of digitized primary market data to enable the plurality of users to search the plurality of digitized primary market data.

Advantageously, the present disclosure mitigates limitations within the prior art relating to the field of computer-assisted business methods, and to systems for implementing such methods, and more specifically, to computer-based methods for supporting multiple functions such as communication, information management, deal execution, stakeholder collaboration, pricing calculation, securities offering and issuance, and analytics for issuers, investors, and dealers.

In addition, there is a great need for a fixed income big-data centralization where advanced analytics such as price discovery, liquidity risk management, intelligence gathering, pre-trade and post-trade analytics can be performed globally, to increase the overall efficiency of the fixed income market and understanding of the credit risk valuations. With no centralized hub, issuers and investors operate with partial awareness. Accordingly, the present disclosure provides a centralized big-data hub powered with artificial intelligence (AI) capabilities for fixed income analytics. The centralized big-data hub comprises an AI application utilizing deep historical data records of fundamental data elements (audited statements, dealer supplied primary and secondary bond price quotations etc.) and secondary market bond transactions, and can solve this problem.

BRIEF DESCRIPTION OF THE DRAWINGS

Several exemplary embodiments of the present disclosure will now be described, by way of example only, with reference to the appended drawings in which:

FIG. 2I shows an actual spread and predicted spread (out-of-time prediction) for the ISIN of FIG. 2F based on model implemented with a Bidirectional Long Short-term Memory (BLSTM) neural network;

FIG. 3I outlines the exemplary steps of the discovery and matching engine executed by a processor for matching at least one target institutional buyer with the fixed income market opportunity;

FIG. 14 illustrated a table of financial data and rates.

DETAILED DESCRIPTION OF EXEMPLARY EMBODIMENTS

Figure 1A:
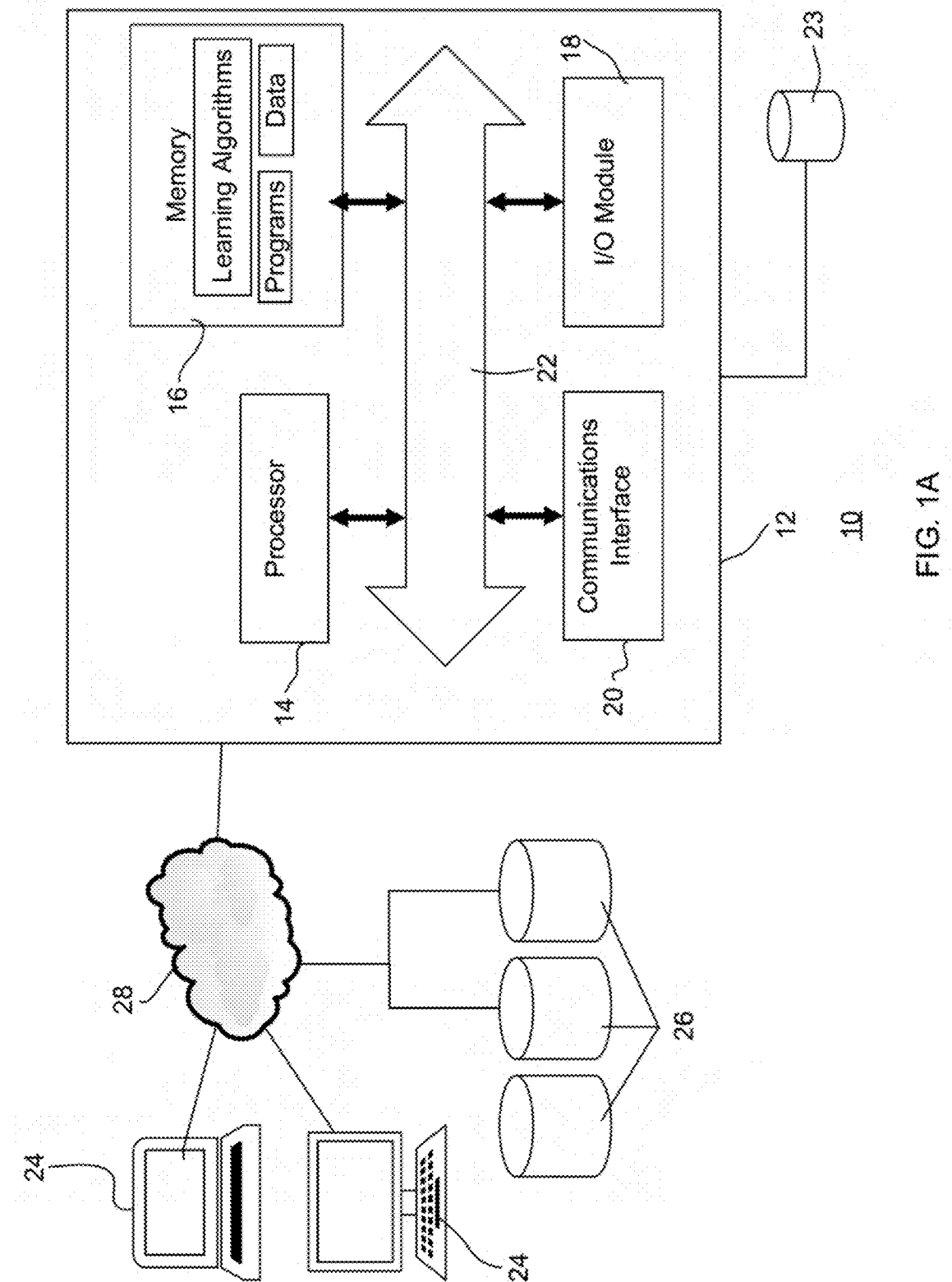
FIG. 1A shows an operating environment for a computerized end-to-end platform for primary bond origination in a fixed income market.

The detailed description of exemplary embodiments of the invention herein makes reference to the accompanying block diagrams and schematic diagrams, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present disclosure in any way. Connecting lines shown in the various figures contained herein are intended to represent exemplary functional relationships and/or physical couplings between the various elements. It should be noted that many alternative or additional functional relationships or physical connections may be present in a practical system.

Embodiments of the invention comprise a system that will digitize primary market data, including the processes, logistics, analytics, issuances, communication, collaboration, information management, relationship management, predictive analytics, cognitive computing and big data analytics, and any other functions. Users for this platform are issuers, dealers, investors, and/or any other primary market participants, and the platform digitizes their experience with deal-related and non-deal-related primary market activities.

The platform brings all primary market participants, including issuers, dealers, investors, legal counsel, and rating agencies, among others, on to a digital platform. The platform automates manual functions, increases market transparency, facilitates price discovery, allows users to execute primary market deals, and aggregates, processes and manages information, among others.

Embodiments of the invention comprise an electronic system built for the capital markets that allows users to perform a plurality of the following functions: manage information, documentation, relationships, and logistics; communicate directly with issuers, dealers, and/or investors, among others; submit inquiries and/or bids directly to an issuer; manage the deal lifecycle; distribute securities using conventional clearing and settlement methods; generate and fill an order book; allocate orders; leverage tools to distribute data between issuers, dealers, and investors, among others; conduct auctions for multiple securities from one or more issuers; utilize interactive calendaring functions, meeting management, marketing campaigns, roadshows, among other marketing and sales activities; access real-time market analytics and indices covering fixed income and/or equity markets; generate cognitive computing and big data analysis from the platform directly; use predictive analytics; and generate custom reports for any of the features or views based on the underlying subject matter.

The electronic system is designed for parties involved in the capital raising industry. The platform comprises a secure cloud-based platform that employs both systemized and ongoing user verification and identification protocols. The platform's cloud infrastructure ensures highest availability and performance with multiple availability zones and data centres globally. The platform allows users to communicate and build relationships with other issuers, dealers and investors; send and receive financial information efficiently; manage all primary market-related information in one-place; and perform advanced and predictive analytics using private and public data. Through these capabilities, the platform provides tools to assist issuers in all stages of capital raising and further comprises using data-driven methods to enhance investor and dealer relationship management, communicating with key stakeholders real-time on a secure system, discreetly discovering potential investor demand, and accessing the most up-to-date market intelligence directly from dealers, investors and other participants. Similarly, the platform provides sophisticated tools to assist investors with all stages of investing in new issues of securities including building and measuring relationships with different market stakeholders, communicating with key stakeholders real-time on a secure system, enhancing decision-making with sophisticated credit analysis tools and intelligence, digitally discovery price and new issue supply through a discreet channel, and improving operational efficiency through the use of a centralized depository for all relevant documents.

FIG. 1A illustrates an overview of a computerized end-to-end platform 10 for primary bond origination in a fixed income market, in which the end-to-end platform and support framework is configured to receive and process financial market data. Platform facilitates pre-deal data processing and multi-party communication, deal execution transition, and deal execution workflow. The workflow is highly customizable. Depending on deal type and asset class, the platform's deal execution workflow is customizable in terms of execution stages, fields, and conditions. The platform provides a seamless suite of modules that enable users to participate in the primary capital markets, in the context of both pre-deal data processing and communication or deal related market activities. The platform provides access to three core user groups; securities issuers, investors, and dealers and comprises an end-to-end primary market platform. Given the heavily regulated nature of the debt issuance industry, the platform provides deal workflow depending on market segment and region, provides record-keeping and an audit trail, and allows for strict information control.

Computerized end-to-end platform 10 provides a centralized hub where advanced analytics such as price discovery, liquidity risk management, intelligence gathering, pre-trade and post-trade analytics can be performed globally, thereby increasing the overall efficiency of the fixed income market and understanding of the credit risk valuations for issuers and investors. Platform 10 uses deep historical data records of fundamental data elements (audited statements, dealer supplied primary and secondary bond price quotations etc.) and secondary market bond transactions to provide fixed income analytics.

Platform 10 comprises computing means with computing system 12 comprising at least one processor such as processor 14, at least one memory device such as memory 16, input/output (I/O) module 18 and communications interface 20, which are in communication with each other via centralized circuit system 22, as shown in FIG. 1A. Although computing system 12 is depicted to include only one processor 14, computing system 12 may include a number of processors therein. In an embodiment, memory 16 is capable of storing machine executable instructions, data models and process models. Database 23 is coupled to computing system 12 and stores pre-processed data, model output data and audit data. Further, the processor 14 is capable of executing the instructions in memory 16 to implement aspects of processes described herein. For example, processor 14 may be embodied as an executor of software instructions, wherein the software instructions may specifically configure processor 14 to perform algorithms and/or operations described herein when the software instructions are executed. Alternatively, processor 14 may be configured to execute hard-coded functionality. Computerized end-to-end platform 10 may be software (e.g., code segments compiled into machine code), hardware, embedded firmware, or a combination of software and hardware, according to various embodiments.

Examples of the I/O module 18 include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a microphone, a speaker, a ringer, a vibrator, a light emitting diode display, a thin-film transistor (TFT) display, a liquid crystal display, an active-matrix organic light-emitting diode (AMOLED) display, and the like. In an example embodiment, processor 14 may include I/O circuitry configured to control at least some functions of one or more elements of I/O module 18, such as, for example, a speaker, a microphone, a display, and/or the like. Processor 14 and/or the I/O circuitry may be configured to control one or more functions of the one or more elements of I/O module 18 through computer program instructions, for example, software and/or firmware, stored on a memory, for example, the memory 16, and/or the like, accessible to the processor 14.

Communications interface 20 enables computing system 12 to communicate with other entities over various types of wired, wireless or combinations of wired and wireless networks, such as for example, the Internet. In at least one example embodiment, communications interface 20 includes a transceiver circuitry configured to enable transmission and reception of data signals over the various types of communication networks. In some embodiments, communications interface 20 may include appropriate data compression and encoding mechanisms for securely transmitting and receiving data over the communication networks. Communications interface 20 facilitates communication between computing system 12 and I/O peripherals.

Centralized circuit system 22 may be various devices configured to, among other things, provide or enable communication between the components (12-20) of computing system 12. In certain embodiments, centralized circuit system 22 may be a central printed circuit board (PCB) such as a motherboard, a main board, a system board, or a logic board. Centralized circuit system 22 may also, or alternatively, include other printed circuit assemblies (PCAs), communication channel media or bus.

A plurality of user computing devices 24 and data sources 26 are coupled to computing system 12 with communication network 28. User computing devices 24 can therefore access platform 10 to run queries and receive requested market insights and predictions based on financial market data from data sources 26. Platform 10 can be operable to register and authenticate users (using a login, unique identifier, and password for example) prior to providing access to applications, a local network, network resources, other networks and network security devices.

Figure 1B:
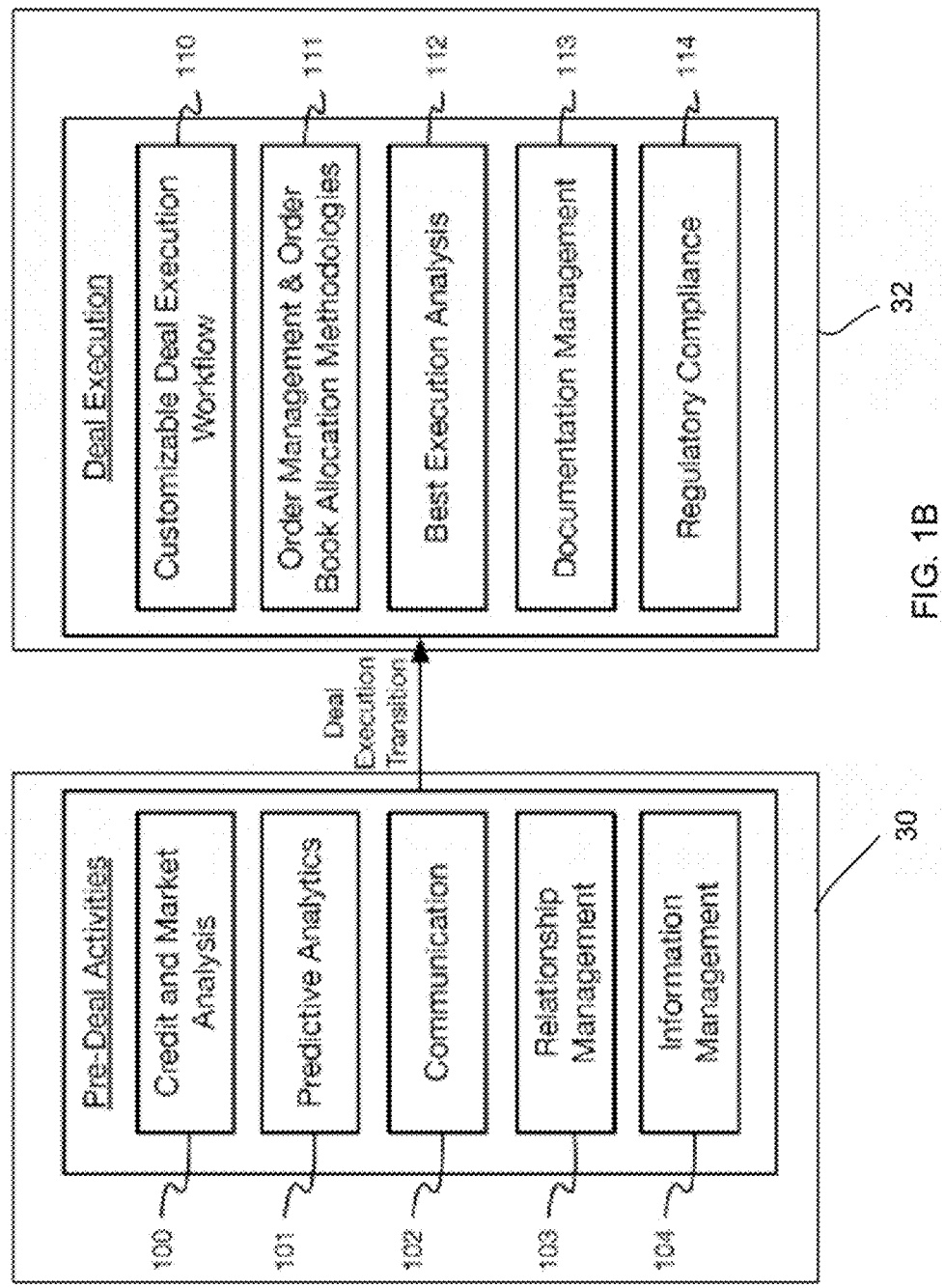
FIG. 1B shows an overview of the platform and its workflow that allows users to perform all primary market-related activities on the platform.

Looking at FIG. 1B, processor 14 can execute instructions in memory 16 to configure pre-deal utility 30 and deal execution utility 32, and other functions described herein. As shown in FIG. 1B, pre-deal activity module 30 is configured to allow a plurality of users to perform credit and market analysis 100, predictive analytics 101, communications functions 102, relationship management 103, and information management 104. Deal execution module 32 is configured to allow the plurality of users to perform a customized deal execution workflow 110, order management and order book allocation methodologies 111, best execution analysis 112, documentation management 113, and regulatory compliance 114.

In more detail, pre-deal utility 30 comprises a suite of predictive algorithms for the fixed income capital markets, such as price analytics engine 34, predictive issuance analytics engine 36, and discovery and matching engine 38, which receive pre-processed data derived from a plurality of raw data sources 26. Processor 14 is configured by the machine executable instructions to receive input data for processing by the pre-deal utility 30 and deal execution utility 32 using the data models to generate pricing and issuance predictions associated with financial instruments, and matching recommendations of financial instruments to buyers and issuers. Exemplary financial instruments may include currency; debt; bonds, loans; equity shares; derivatives; options, futures, forwards.

Figure 1C:
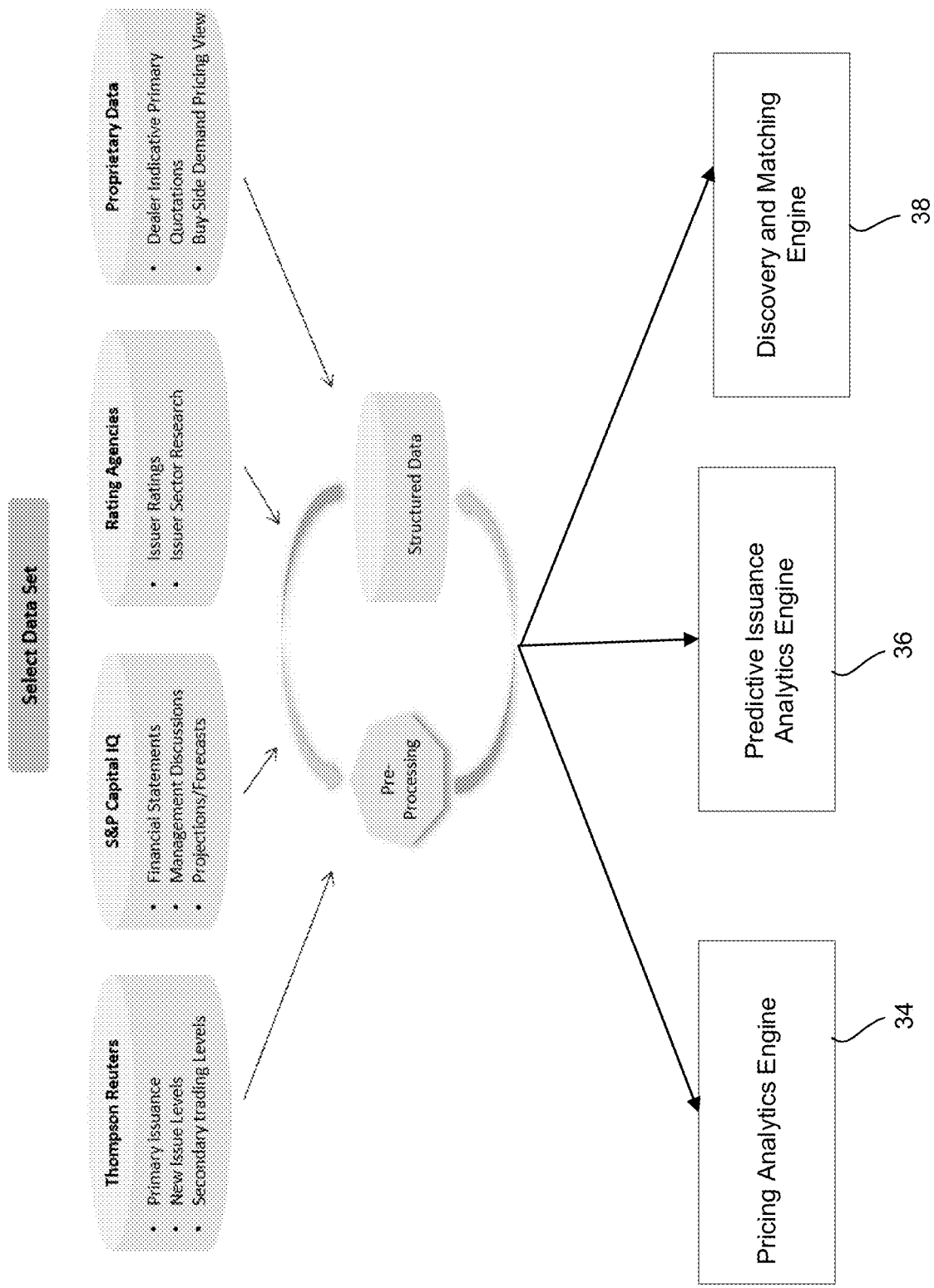
FIG. 1C shows select data sets that are pre-processed for price analytics engine, predictive issuance analytics engine, and discovery and matching engine.

As shown in FIG. 1C, select data sets are pre-processed by processor 14. Exemplary data families received and pre-processed for price analytics engine 34, predictive issuance analytics engine 36, and discovery and matching engine 38 comprise:

secondary market spread movements, sourced from Thompson Reuters™, with an Interday update frequency, and comprises the intraday transaction prices of companies' bonds are used to measure spread movements and the current cost of funding for all companies in the coverage universe;

recent issuance pricing levels and dealer quotations, sourced from Thompson Reuters and Proprietary Network, with an Interday update frequency. At issuance securities pricing levels allows for comparison of at issuance pricing versus first 5 days of trading. Primary dealer quotation averages allow for model calibration with respect to pre-issuance quotations and supply-demand metrics versus at issuance and post issuance price performance;

company credit ratings, sourced from S&P™, Moody™, DBRS (Canada)™, Fitch (USA)™, updated on a weekly basis, or quarterly. Issuer's past bond issuances and their ratings as well as composite rating for the issuer overall indicate the company's risk level and benchmarking category. This data is used to train the models and to back-test the accuracy of price analytics engine 34 output;

company fundamental data, sourced from S&P Global Market Intelligence Weekly updates, updated on a weekly basis, or quarterly. The company's fundamental financial data is an indicator of the company's credit-worthiness, and by extension, their cost of borrowing across tenors. In addition, fundamental metrics indicate the liquidity need of the company and its short term need to raise financing. The financial profile of a company aids with clustering analysis of companies with similar characteristics. It is expected that companies with similar financial characteristics and balance sheets would have similar bond issuance patterns;

eMAXX Investor Holdings, sourced from Data eMAXX Investor Holdings Data, updated on a quarterly basis. Thomson Reuters™ provides security-specific data on corporate, government, municipal, and MBS bond holdings for more than 2,900 investor portfolios including their coupon type, maturity, credit rating, and par value;

investor insights campaigns, proprietary data sourced from Overbond Limited, updated on a monthly basis. A Community of more than 250 institutional investors provides indicative sector, tenor, price and size preferences for hypothetical issuance in investment grade and high yield credit. For example, discovery and matching engine applies aggregate investor preference to calibrate traditional and non-traditional buyer patterns;

prospectus filings, sourced from EDGAR (USA)™, SEDAR (Canada)™, public filings international Daily/when filed Prospectus filings is an indicator that a company deterministically plans to raise additional financing;

macro market data, sourced from Central Banks/Treasuries and public sources, with an Interday update frequency. Changes in interest rates and economic data has an impact on the attractiveness of the fixed income markets and the availability of credit, and by extension, likelihood for companies to issue bonds;

outstanding securities, sourced from Thomson Reuters, with an Interday update frequency. The outstanding securities allows for calculation if the company has upcoming maturities that need to be refinanced. The maturity schedule of the outstanding securities is used to calculate gaps which may increase issuer likelihood to issue in a specific tenor;

historical bond issuance, sourced from Thomson Reuters, with an Interday update frequency. Issuer's past bond issuances indicate issuance frequency, seasonality, and propensity for specific tenors, and may be used to train the models and to back-test the accuracy of predictive issuance analytics engine 36's predictions; and industry sector information, sourced from Thomson Reuters, Public Sources, systematically updated. Different industry sectors have vastly different bond issuance patterns and frequencies. The models are tuned to each sector specificity and issuers are grouped to their closest peers.

Figure 2A:
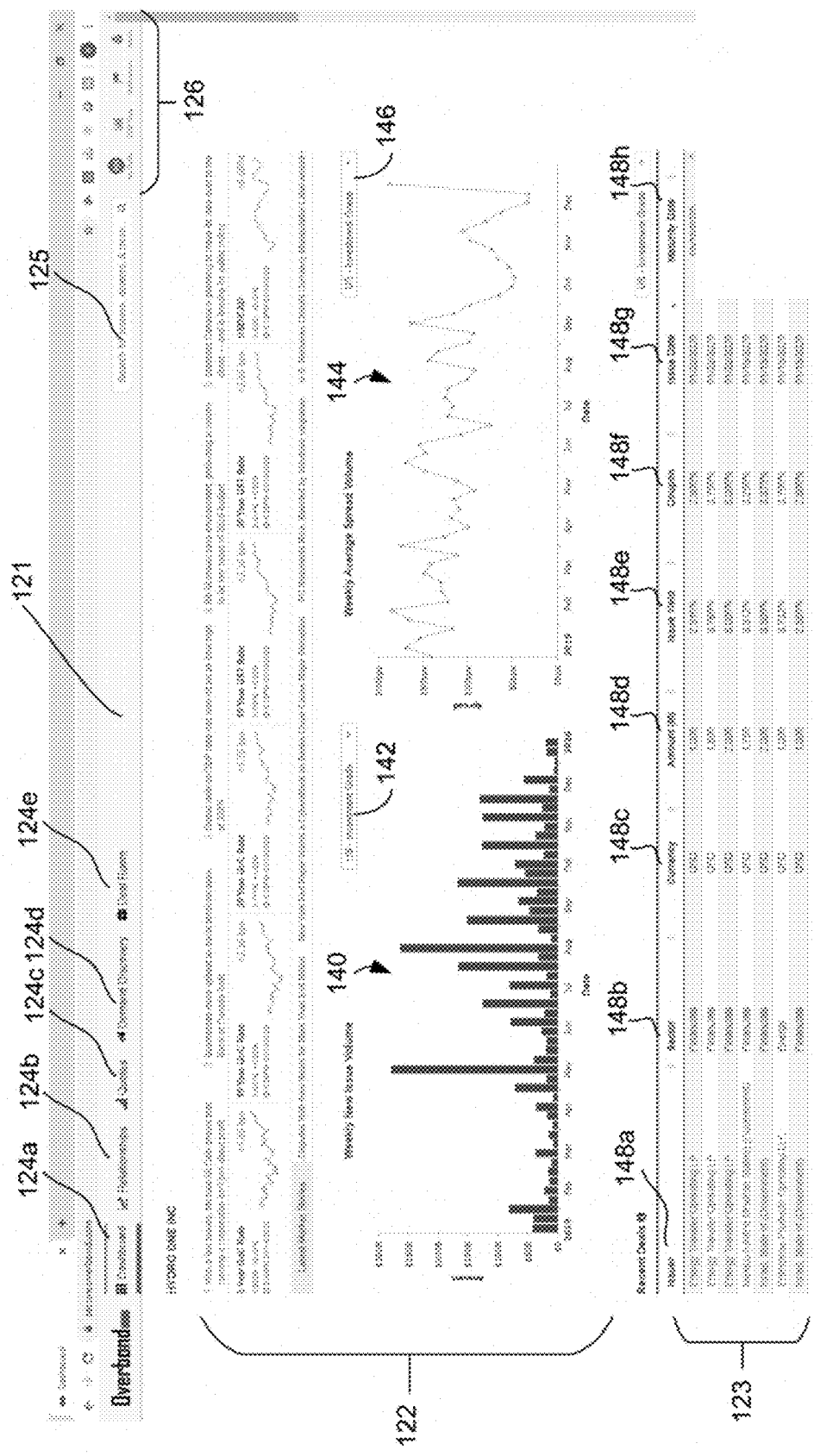
FIG. 2A shows exemplary user interface with a dashboard associated with pricing, issuance and discovery of financial instruments, such as bonds.

FIG. 2A shows exemplary user interface 120 with a dashboard associated with pricing, issuance and discovery of financial instruments, such as bonds. User interface 120 comprises header section 121, selected issuer section 122, and recent deal section 123. Header section includes a plurality of tabs, such as dashboard tab 124a, relationships tab 124b, quotes tab 124c, demand discovery tab 124d, and deal room tab 124e. Search field 125 allows users to enter queries pertaining to issuers, dealers, and so forth. Icons 126 also appear in section 121, and pertain to user account, platform tools, notifications and administrator portal.

Selected issuer section 122 comprises identification 132 of the selected issuer, relevant news summaries 134, weekly new issue volume 140 and associated drop-down menu to select bond type 142, weekly average spread volume 144 and associated drop-down menu to select bond type 146. Recent deal section 123 includes drop-down menu 147 for selecting bond type, a list of issuers 148a, associated sector 148b for each respective issuer 148a, currency 148c, amount 148d, issue yield 148e, coupon 148f, issue date 148g and maturity date 148h.

Figure 2B:
FIG. 2B illustrates a price analytics engine configured to minimize credit pricing risk and enabling systematic monitoring of credit pricing in a plurality of currencies and monitoring the cost of swapping proceeds from a first currency to a second currency.

In more detail, FIG. 2B illustrates price analytics engine 34 configured to minimize credit pricing risk and enabling systematic monitoring of credit pricing in a plurality of currencies and monitoring the cost of swapping proceeds from a first currency to a second currency. Price analytics in different liquidity buckets and integrated machine-learning modules provide a reduction in credit pricing risk, enabling systematic monitoring of credit pricing in a variety of currencies e.g. all G10 currencies, covering large universe of issuer names as well as monitoring of the cost of swapping proceeds from foreign currency to domestic currency.

Price analytics engine 34 comprises a suite of digital tools that allow users to monitor and perform advanced analysis 100 on pricing, credit, and market data. Digital New Issue Level Indication module 200 provide users with an ability to publish indicative new issue pricing levels ("Pricing Indication") to other market participants. Currently, issuers and investors receive these indications from multiple dealers on a weekly basis in disparate formats and channels. The purpose of such communication is to allows users to indicate their view of the pricing level of a new issue for a specific issuer given the prevailing market conditions. Through digitizing the process and converting data into structured forms, platform 10 is able to generate intelligence by utilizing machine learning and big data technologies to provide advanced predictive analytics and data-driven insights. FIG. 14 illustrates an example of a Pricing Indication sheet sent by a dealer to an issuer.

The Digital New Issue Indication 200 tool allows dealers to manage and communicate these indications in one place through platform 10. Through the use of platform 10, dealers are able to publish pricing indications publicly or privately with specified target user groups. Moreover, users can communicate with their internal team members to collaborate on preparing indicative new issue levels prior to publishing and communicating with their clients. Further, users are able to generate and send indicative pricing sheets in multiple formats such as PDF and Microsoft Word through other delivery channels including email. Users receiving the Pricing Indications can aggregate all Pricing Indications received on platform 10 or view them through traditional communication channels such as a PDF attachment in an email. Additionally, users are able to communicate the current secondary levels, commentaries on the market, and peer group indicative new issue levels through platform 10. Such information is often used to support the Pricing Indications quoted by market participants. Platform 10 allows for advanced visualization of the aggregated data through the Secondary Level Analysis and Visualization 201, Historical Trend Analysis 202, Historical Deal Analysis 203, and Sector & Peer Comparison 204 tools. The aggregated data will be executed by algorithm to form unbiased analysis. Unlike traditional methods that may require longer time to collect data and analyze, platform 10 automates the process and deliver new insights that are currently unavailable. Users are able to aggregate data received on platform 10 and data transmitted through emails and APIs.

Credit and Market Analysis 100 contains several other tools to allow users to analyze the primary market. Namely, the Swap Calculator 205 allows users to convert new issue pricing levels from the platform to equivalent levels in foreign currencies and different interest rate structures. For example, an issuer is able to use the Swap Calculator 205 to find the swapped equivalent rate of its USD and EUR new issues to assess the attractiveness of issuing debt in either USD or EUR. The Secondary Market Liquidity Gauge 206 integrates public data, for example, TRACE, with the user's proprietary private data to gauge current secondary market liquidity, given a particular set of securities and particular group of dealers. The aggregate data is used to teach machine learning algorithms for the purpose of generating new insights that are not currently available. Such a tool is used by primary market participants given the deteriorating secondary market liquidity conditions, driven in part by new regulations. Additionally, the Covenant Analysis Tool 207 allows users to view the covenant set offered by a particular security issuer, compare it over past new issues, and analyze each covenant in detail by accessing the specific covenants language contained in offering documents. Platform 10 is designed to recognize the similarities or certain patterns in covenant language. The Bond Price Calculator 208 allows users to determine the price of new issue levels and secondary issue levels. The Documentation Lookup and Analysis 209 tool allows users to access relevant financial documents related to each issuer. Platform 10 uses a document conversion tool to convert all documents in multiple formats into a standardized format to allow for advanced indexing suited for big data analytics and searching. Platform 10 relies on file formats and conversion methods including native application and special conversion action to process file conversions. Further, platform 10 implements search engine techniques to enable users to search relevant key words efficiently. Platform 10 also hosts comprehensive Dealer, Issuer, and Investor Profiles 210 to allow users to quickly identify each other and perform analysis.

Figure 2C:
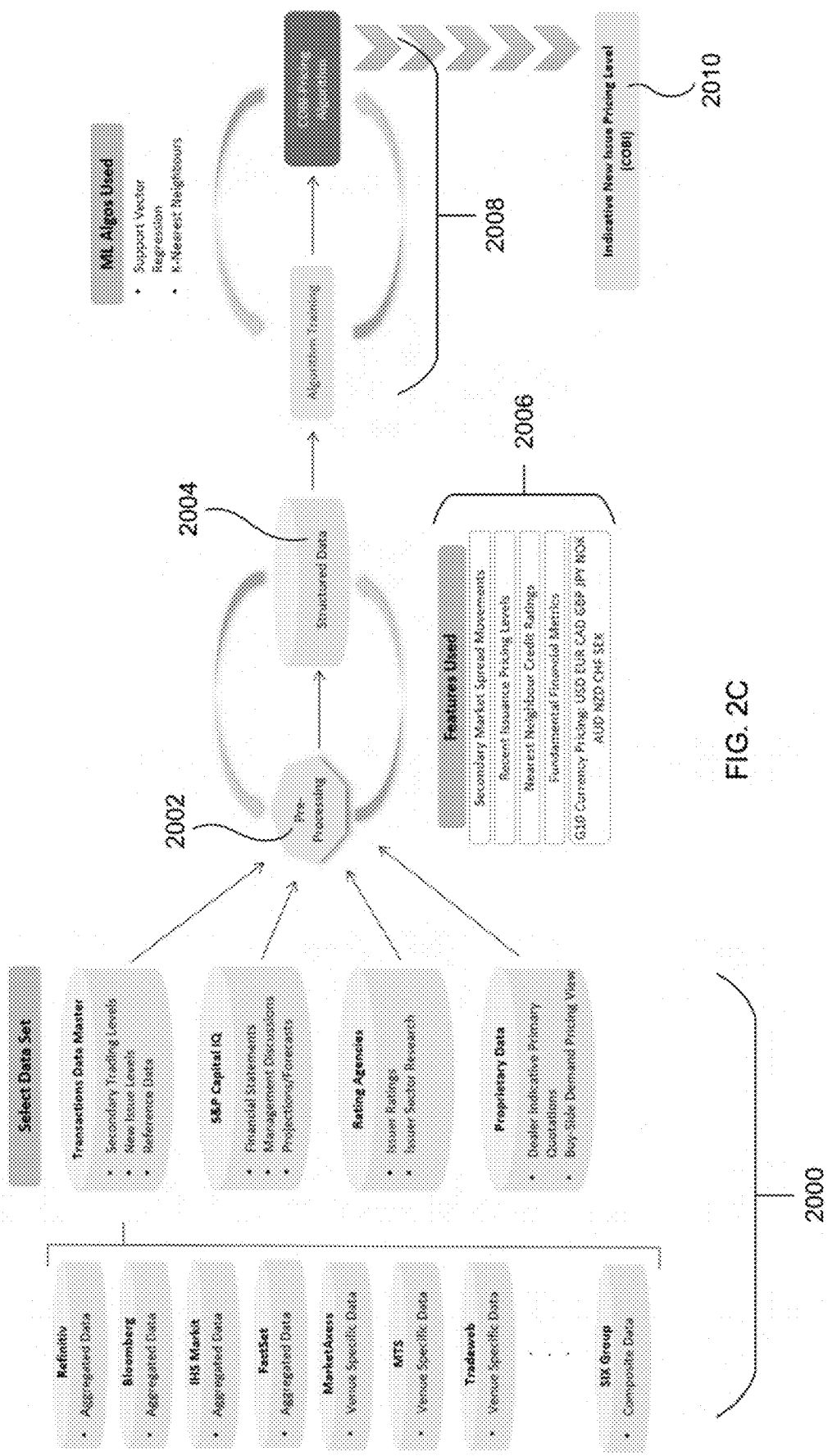
FIG. 2C shows exemplary steps taken by price analytics engine 34 for monitoring and performing advanced analysis 100 on pricing, credit, and market data.

Now referring to FIG. 2C, there is shown details of the price analytics engine 34. As described above, platform 10 sources raw trading and fundamental data via automated scripts executed at predetermined intervals e.g. every 24 hours (step 2000). As noted above, raw data is sourced from major data suppliers in the financial sector, including Thompson Reuters (secondary bond issuance and trading levels), S&P Global Market Intelligence (company level fundamental data), Rating agency composite (company ratings and macro market data), as well as various other sources. Platform 10 sources proprietary data, aggregated and anonymized dealer quotations from a community of large IG issuers, and investor preferences through direct feedback loops.

In step 2002, this raw data is pre-processed and the trading data and fundamental data is structured and mapped to the appropriate issuer ID, and stored in databases 27 (step 2004). The data is systematically scrubbed for anomalies and null values. Finally, a set of key input factors are generated based on the raw input (step 2006). These include but are not limited to factors that measure secondary market spread movements, recent issuance pricing levels, nearest neighbor credit ratings and fundamental financial metrics. These factors are divided between sector and company specific and are used as inputs to the machine learning models.

The structured data is fed into the machine learning algorithm as training data to generate several models to calculate the output pricing levels (step 2008). Exemplary machine learning algorithm comprises three-phases engineered to measure best-fit correlations with respect to company fundamental valuation and secondary market pricing for their bonds across sector peers and market conditions at large, with models tuned for different liquidity scenarios. As an example, these models are each trained using a subset of the past data, ranging from one day, one month to a maximum of ten years, for example. Advanced sampling techniques are used to account for data gaps for illiquid issuers in order to construct yield curves for all tenors and all issuers in coverage universe. An issue pricing level for a new is output in step 2010.

Figure 2D:
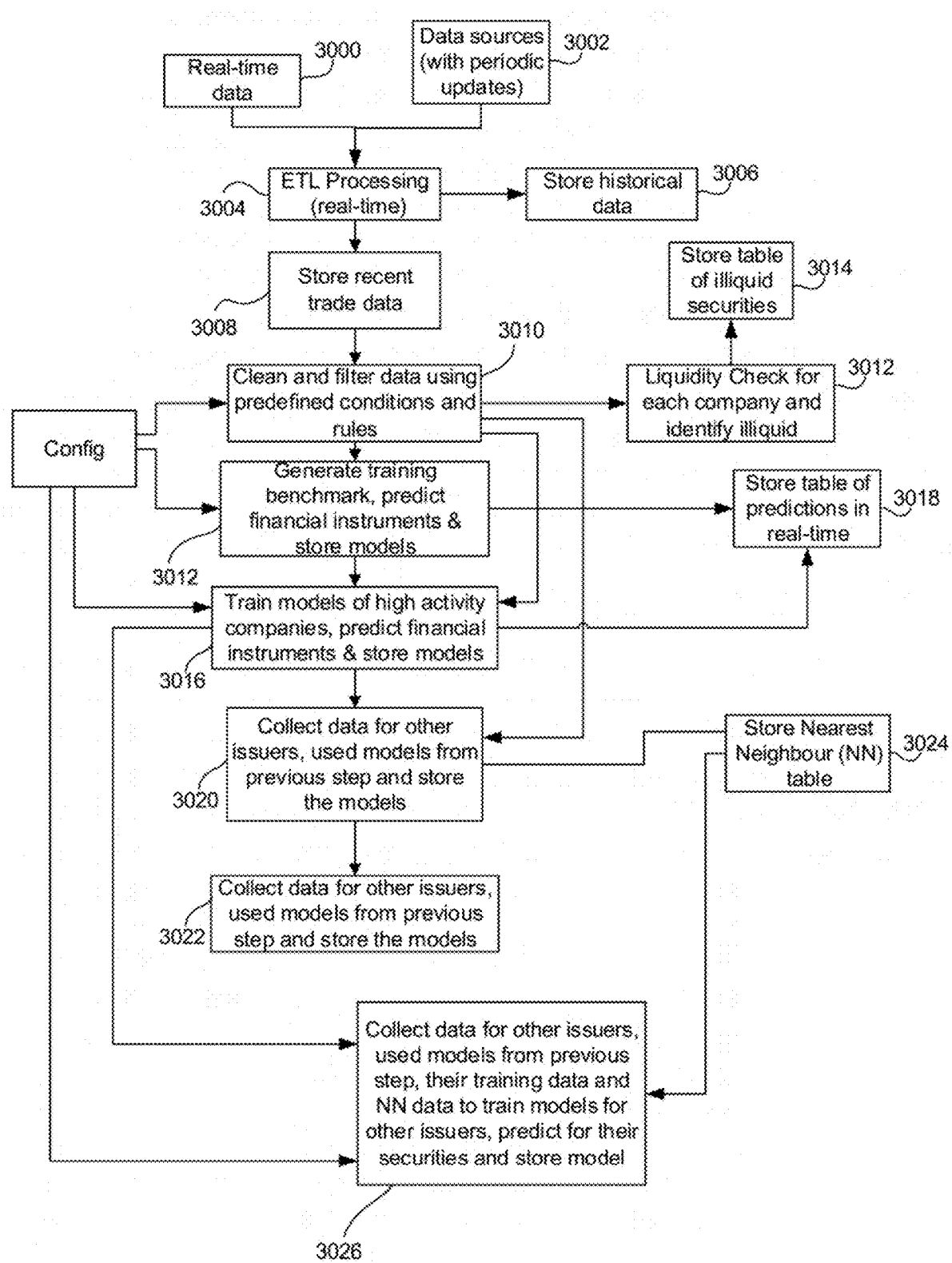
FIG. 2D illustrates a model of the price analytics engine for measuring best-fit correlations with respect to company fundamental valuation and secondary market pricing for their bonds across sector peers and market conditions.

FIG. 2D a flow chart outlining exemplary steps implemented by price analytics engine 34, in one exemplary implementation, and with additional reference to FIGS. 1*a*, 1*b*, 2, 4*a*-10. In step 3000, real-time trading data is fed into a data extraction/transformation/loading (ETL) data pipeline for processing, and historical data is also retrieved from a plurality data sources (step 3002) and fed into ETL data pipeline for processing (step 3004). Accordingly, data is retrieved from data from one or more sources, e.g. streaming data, in real-time or near real-time (extraction); and the data is reformatted (transformation); and the data is loaded into target database 27. The stored data may include historical quotes (step 3006) and the latest quotes updated in real-time e.g. a table of the latest 8 hours of trade activities (step 3008).

In step 3010, the stored data in step 3008 is cleansed and filtered using predefined rules and conditions. A liquidity check is performed for each company to identify illiquid securities (step 3012), and such checks may be performed at predetermined time intervals or at particular times of day. The identified illiquid securities are stored in a database (step 3014).

In step 3016, a training dataset is built and a training model for benchmark is generated and stored for use in the next steps. A final table is updated in real-time for predictions (step 3018). From step 3016, several machine learning (ML) models (SVR), e.g. 60-70 ML models, are trained on predefined high activity companies (high issuers) data and a prediction for a plurality of securities e.g. 1,200 or more, is made (step 3020) and the models are saved and the final table is updated in real-time for predictions (step 3018). Next, data for other issuers e.g. 100 or more is collected and models from the previous steps are used to find Nearest Neighbours (step 3022), this step is performed at predefined intervals or at specific times during the day. The outcome of step 3022 is stored in a Nearest Neighbour table (step 3024). Next, data is collected for other issuers e.g. more than 100 and models from previous steps and their training data and Nearest Neighbour data from Nearest Neighbour table is used to train models for other issuers and predict the securities pricing, and the model is stored (step 3026).

In one example, a XGBoost classifier may be trained by randomly splitting the training data into three parts or sets: training, validation, and testing, such that 80-90% of the data may be in the training set, 5% may be in the validation set and 15-5% of the data may be in the testing set. The training process may be run iteratively by observing patterns in data and making estimated decisions. The validation set is used to measure accuracy during training and make adjustments (if needed) to correct and improve the modeling complexity for the next iteration. This iterative refinement can then be repeated. The training process may stop when a certain criterion is satisfied. In one embodiment, the stopping criteria is reached as certain errors are minimized. The resulting classifier can then be evaluated, utilizing several performance metrics, (e.g., Area Under Curve of Receiver Operating Characteristic or Precision/Recall curves, minimum per-class accuracy, F1, F2, FN scores, Sensitivity/Specificity, etc.) A proper threshold may then be selected to maximize performance and/or pricing prediction.

Figure 2E:
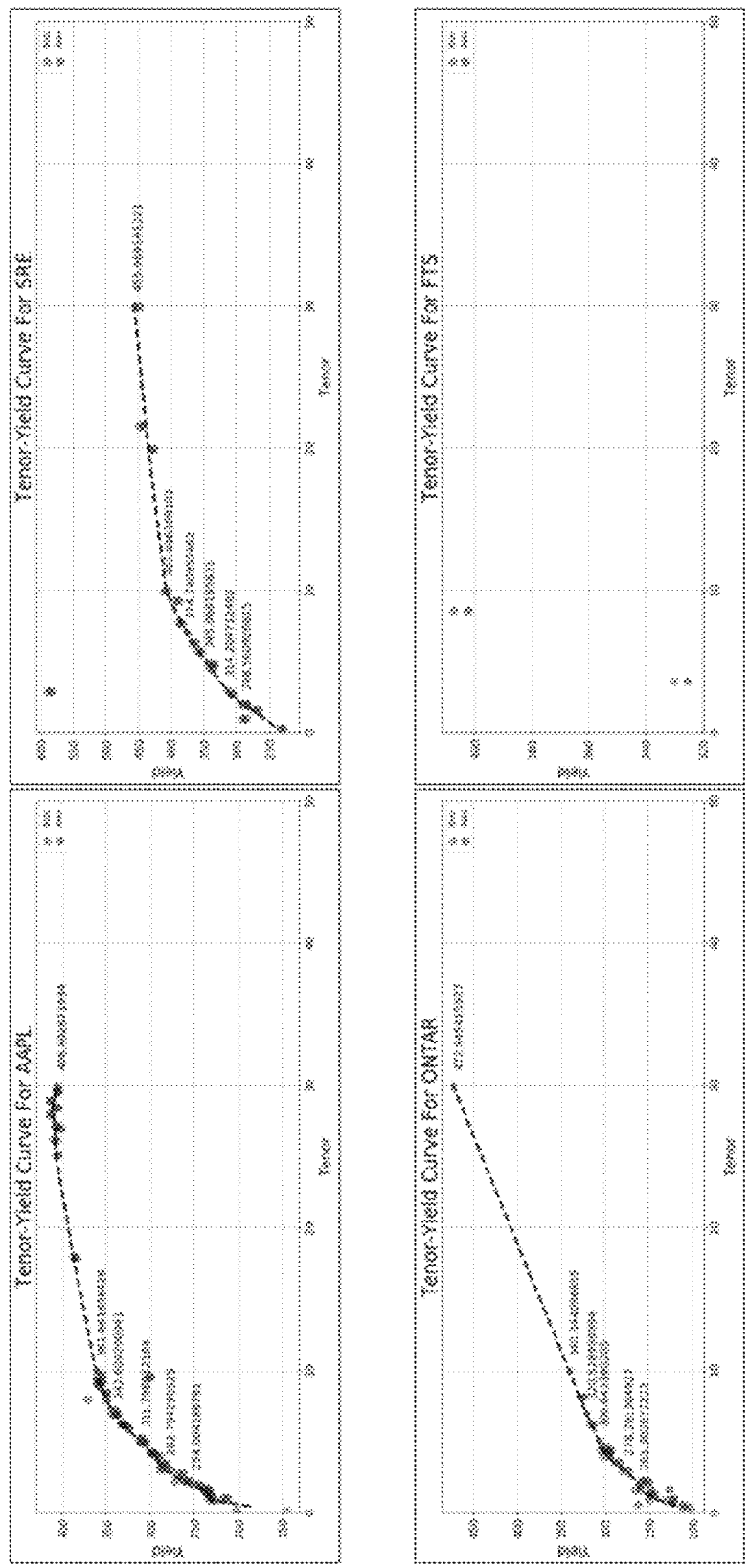
FIG. 2E shows tenor-yield curves for various companies.

In another implementation, price analytics engine 34 is able to handle the illiquid nature of the primary and secondary market. Generally, AI algorithms require large amount of data to internalize market characters to produce accurate results. Due to the illiquid nature of the fixed income market, secondary market data may have some gaps. An issuer with high illiquidity in their bonds that has a low number of bonds outstanding translates into sparse data sets for AI algorithms to train on. For example, as shown in FIG. 2E, Apple™ (first quadrant below) has bid/ask recorded in most of the tenors across the curve.

Price analytics engine 34 handles the problem of sparse data sets by filling the data gaps with balance sheet fundamentals and primary new issue quotation pricing levels to arrive at best fit or relative-value price for secondary market securities. Companies with only a minimal historical data available from secondary market trades of their bonds are enhanced with indicative new issue pricing curves and fundamentals to successfully generate yield curves across all tenors. Price analytics engine 34 finds observable secondary trade data-points during the pricing coverage period.

Illiquid Companies with only minimal trading activity may have modeled and relative-value prices for secondary market securities across all tenors. Their sparse data sets are enhanced with data from its peers, as determined in phase two of the algorithm. Human oversight ensures the output from price analytics engine 34 is accurate by regularly retuning the machine learning algorithm to maintain a minimized mean absolute error (MAE) with respect to the new issue prices available in the market.

In one implementation, price analytics engine 34 builds a spread curve for bond issuers that issue frequently. The pricing model is designed for issuers not for International Securities Identification Number (ISIN). To predict spread for a specific ISIN, a new sequential model is generated, however, the government model for pricing prediction.

Each ISIN has daily pricing information (i.e. bid yield) since its origination until now. Spread can be obtained by subtracting benchmark yield from ISIN's bid yield. Based on the historical spread, a time series model is developed to predict the future spread next day or next week. The model development process consists of 2 components: (1) a government model for estimating benchmark yield based on tenor on a specific trade date; (2) a time series model to predict spread for each ISIN based on historical spread.

Given an ISIN's trade date, historical bid yield for the government bonds that are issued in the same currency as the ISIN's are extracted and tenor is calculated as the number of years between trade date and maturity date for each government bond. To estimate the benchmark bid yield based on tenor, a government model using support vector regression to discover the yield curve shape is built. The input variable is tenor and target variable is government yield.

To calculate the ISIN'S spread on that trade date, the maturity date is used to calculate the ISIN's tenor, and assign a tenor to the government model and then a benchmark yield is projected from the government model. Using this benchmark yield, the spread on that trade date can be calculated.

Figure 2F:
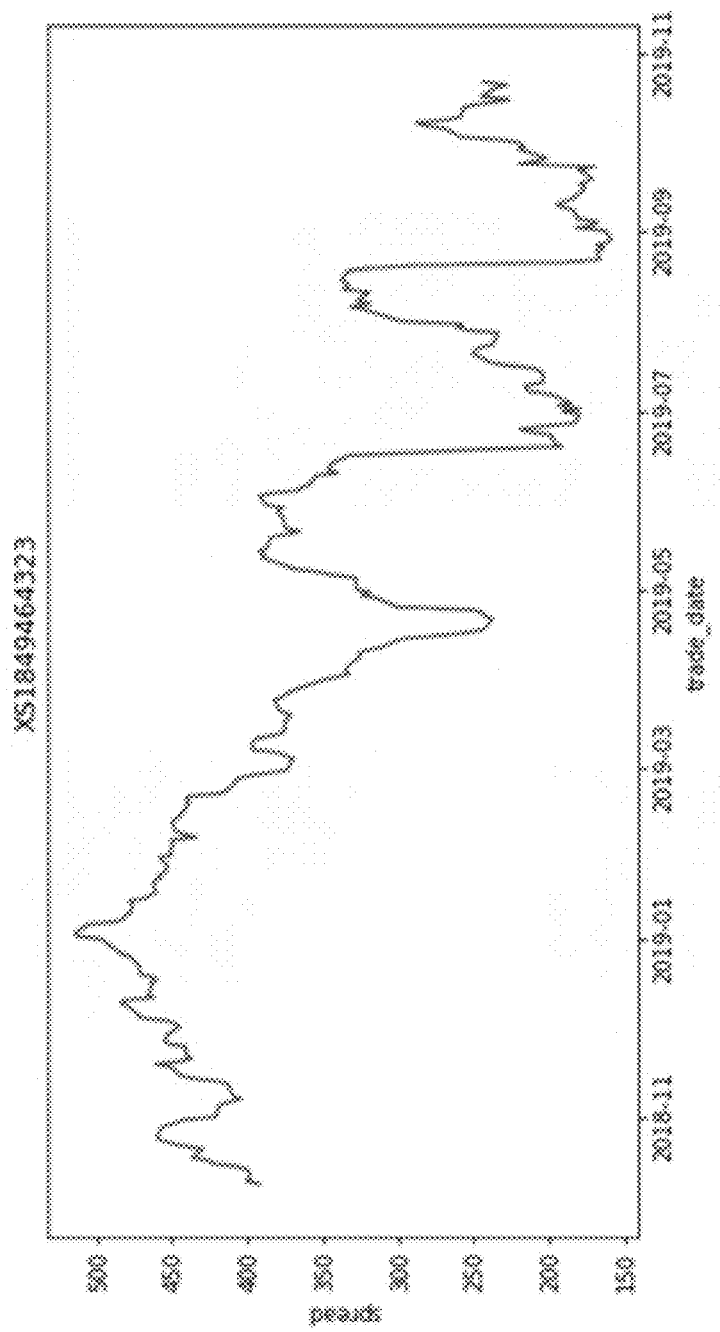
FIG. 2F shows a historical spread for one International Securities Identification Number (ISIN)
Figure 2G:
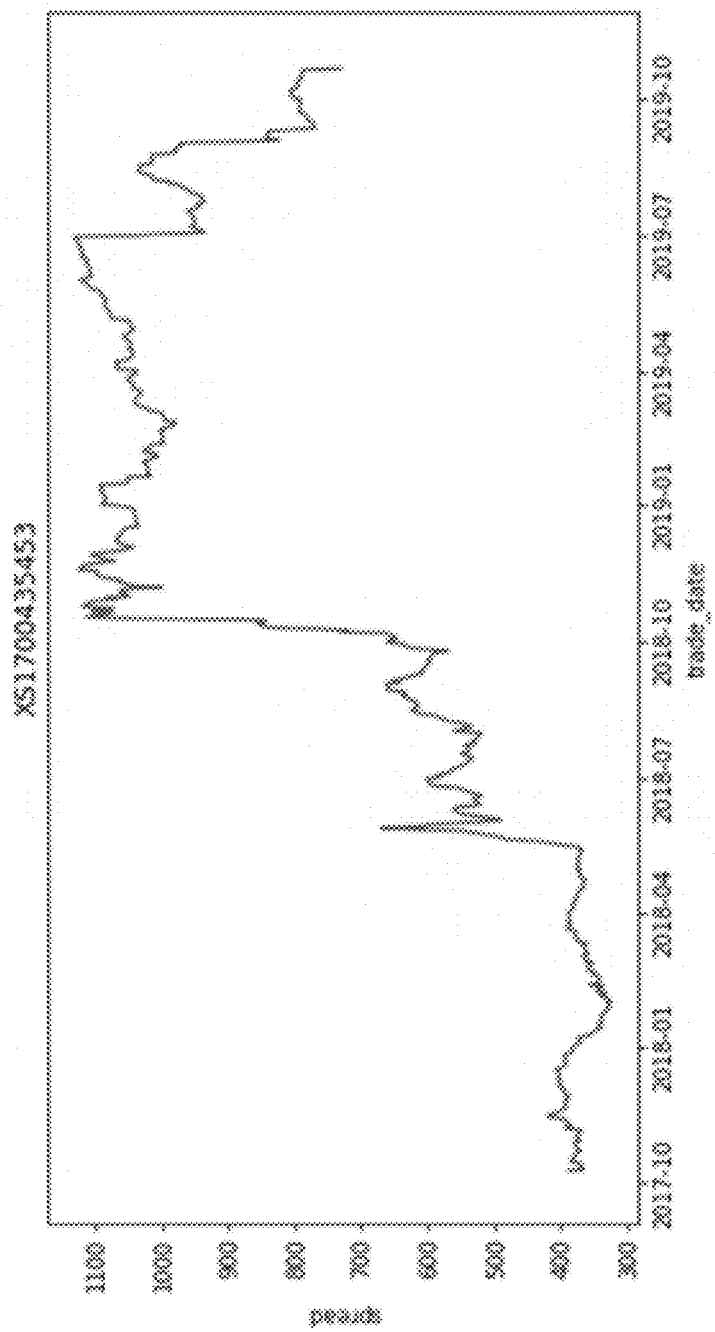
FIG. 2G shows a historical spread for another ISIN.

In one example, as shown in the plots of FIGS. 2F and 2G, historical spreads for each ISIN XS1849464323—Playtech Plc and ISIN XS1700435453—Banaca IFIF SpA have their unique trends and volatility and thus different types of models are applied to them.

Price analytics engine 34 builds a yield curve for bonds issued by government, leverages this data to calculate benchmark yield for specific tenor of each ISIN from this curve and then subtract this from ISIN's bid yield to get spread. After obtaining historical spread, a machine learning algorithm is employed to build a model to predict spread in the future. To validate the model performance, the dataset is separated into training and testing dataset.

Figure 2H:
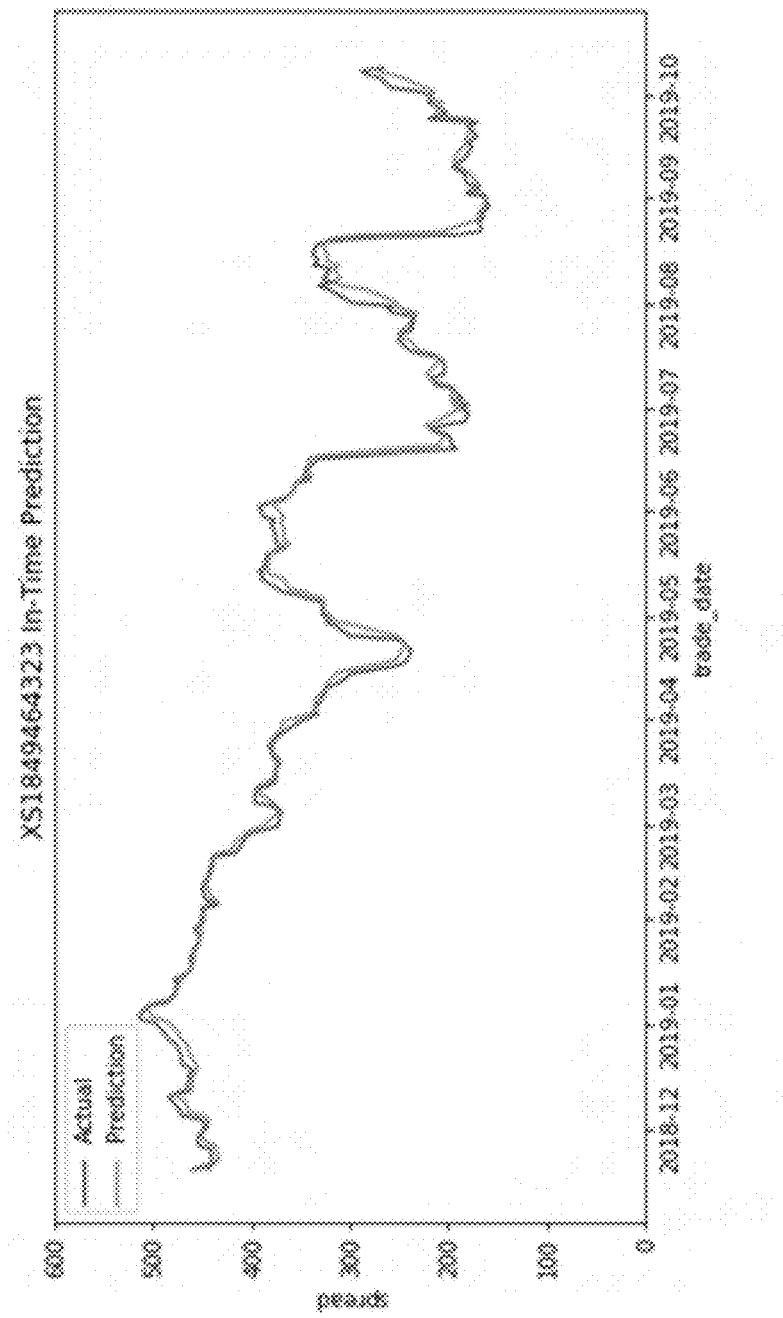
FIG. 2H shows an actual spread and predicted spread (in-time prediction) for the ISIN of FIG. 2F based on model implemented with a Bidirectional Long Short-term Memory (BLSTM) neural network.
Figure 21:
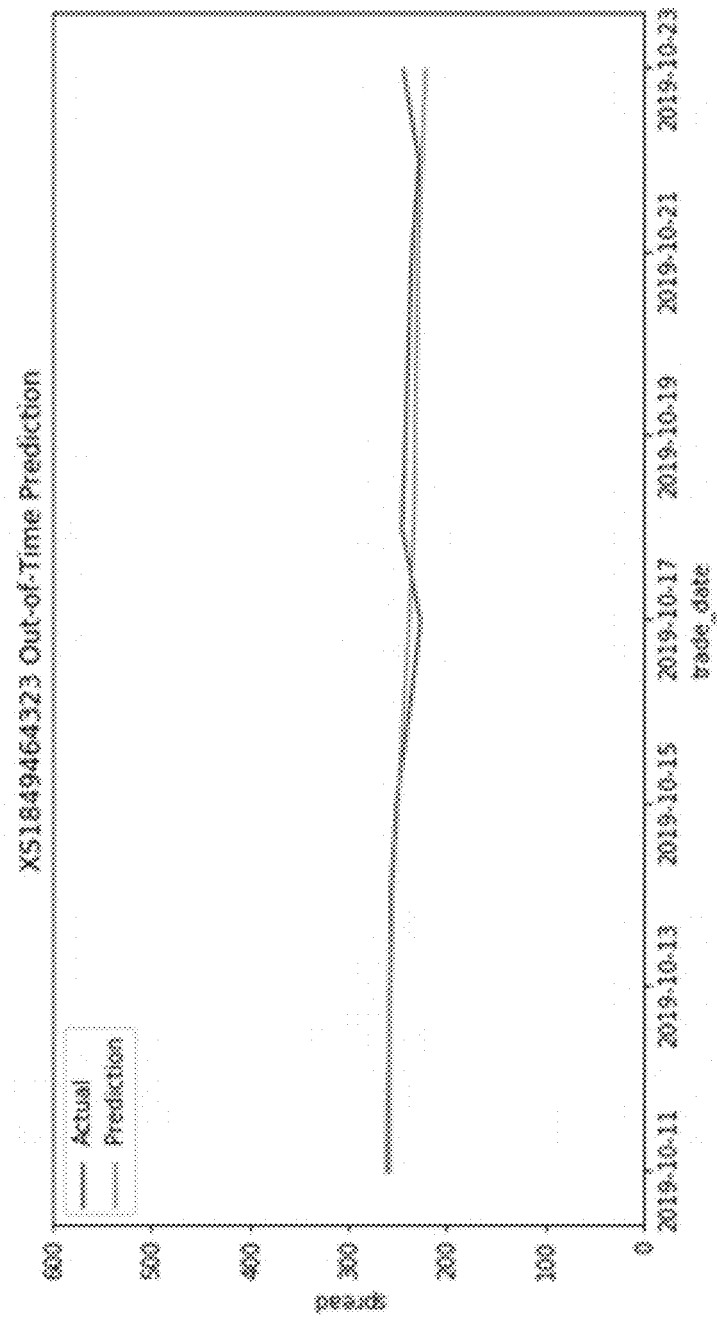

In one example, some ISIN were selected and pre-processed to provide data for model training. One such ISIN was XS1849464323—Playtech Plc, and the model implemented for this ISIN was Bidirectional Long Short-term Memory (BLSTM) Neural Network, a recurrent neural network capable of learning long-term dependencies, and processing the relationship among historical observations in both forward and backward direction. The bidirectional aspect of BLSTM is especially useful for predicting spread since future spread is usually affected by historical data. In one example, the time step for each training step is 30 days, i.e. the model uses information in the past one month and recognizes patterns in the past to predict spread next day. The mean absolute percentage error of training data was 3.64% and that of testing data is 3.076%. Actual and prediction for both training (in time) and testing data (out of time) is shown in the graphs of FIGS. 2H and 2I, respectively.

Figure 2J:
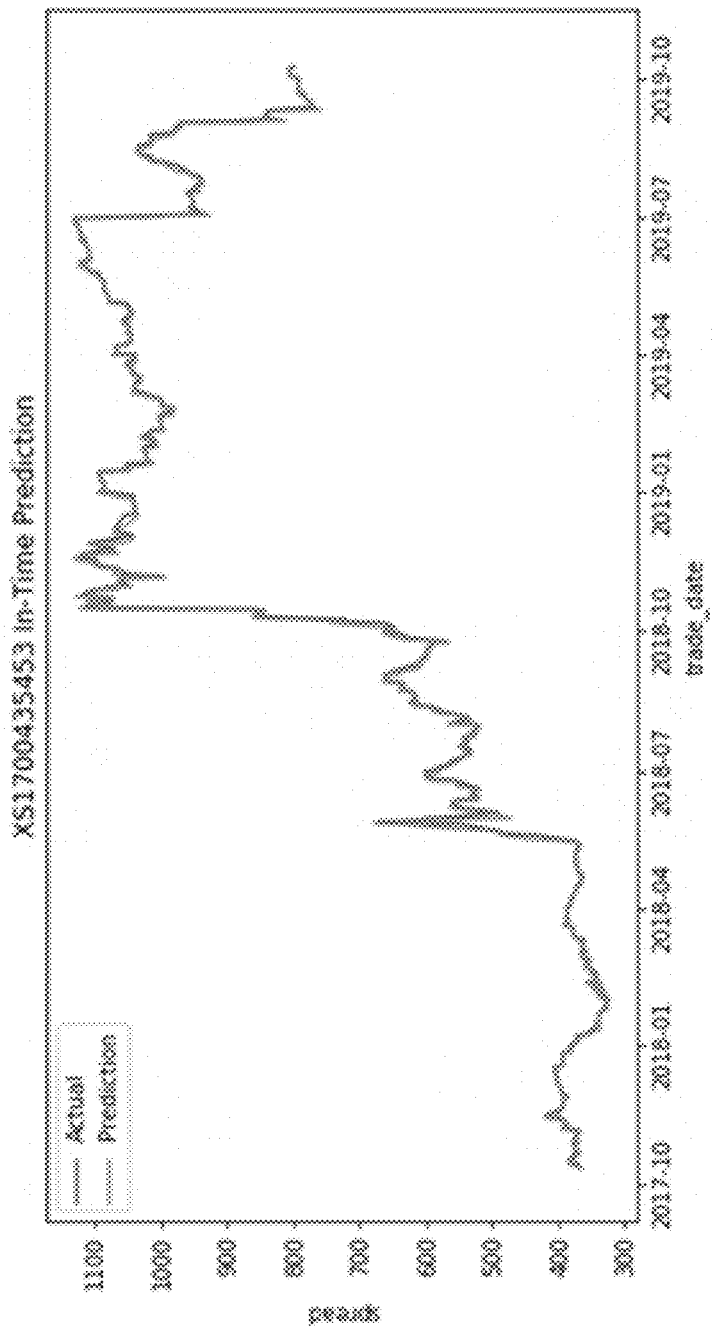
FIG. 2J shows an actual spread and predicted spread (in-time prediction) for the ISIN of FIG. 2G based on model implemented with a Bidirectional Long Short-term Memory (BLSTM) neural network.
Figure 2K:
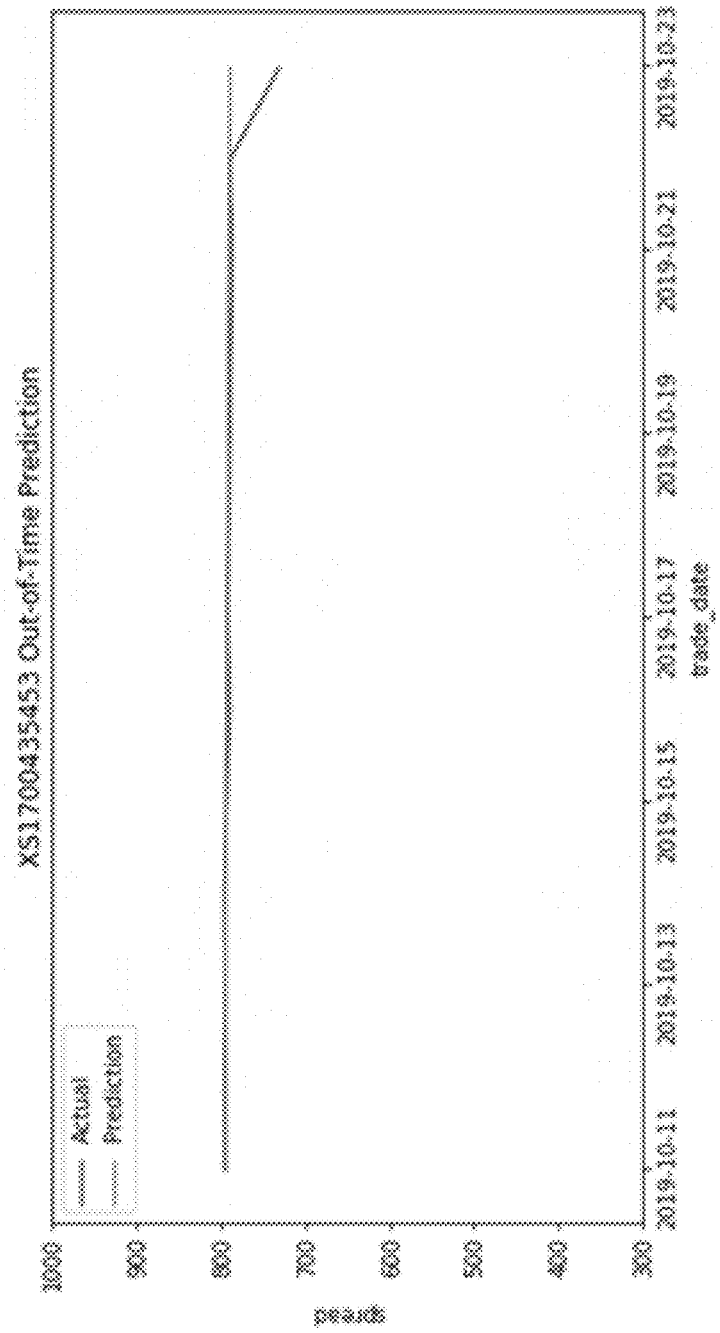
FIG. 2K shows an actual spread and predicted spread (out-of-time prediction) for the ISIN of FIG. 2G based on model implemented with a Bidirectional Long Short-term Memory (BLSTM) neural network.

In another example, ISIN XS1700435453—Banaca IFIF SpA is selected, and the model implemented for was Autoregressive Integrated Moving Average (ARIMA). ARIMA is class of model that captures a suite of different standard temporal structures in time series data, and uses the dependent relationship between an observation and some number of lagged observations i.e. autoregression. The model also uses differencing of original observations (e.g. subtracting an observation from the previous observation) in order to make the time series stationary i.e. integration; and the model uses the dependency between an observation and a residual error from a moving average model applied to lagged observations. For this ISIN, the number of lagged observations is 1, the number of times that observations are differenced is 2 and the size of the moving average window is also 1. The mean absolute percentage error of training data is 1.355% and that of testing data is 1.103%. Actual and prediction for both training (in time) and testing data (out of time) is shown in the graphs of FIGS. 2J and 2K, respectively.

As be seen from the results shown in FIGS. 2H, 2I, 2J, and 2K, the sequential model is able to accurately capture the trend of how spread changes in the future. The same method and analysis can be generalized to other ISINs of interest to make prediction on spread.

Figure 2L:
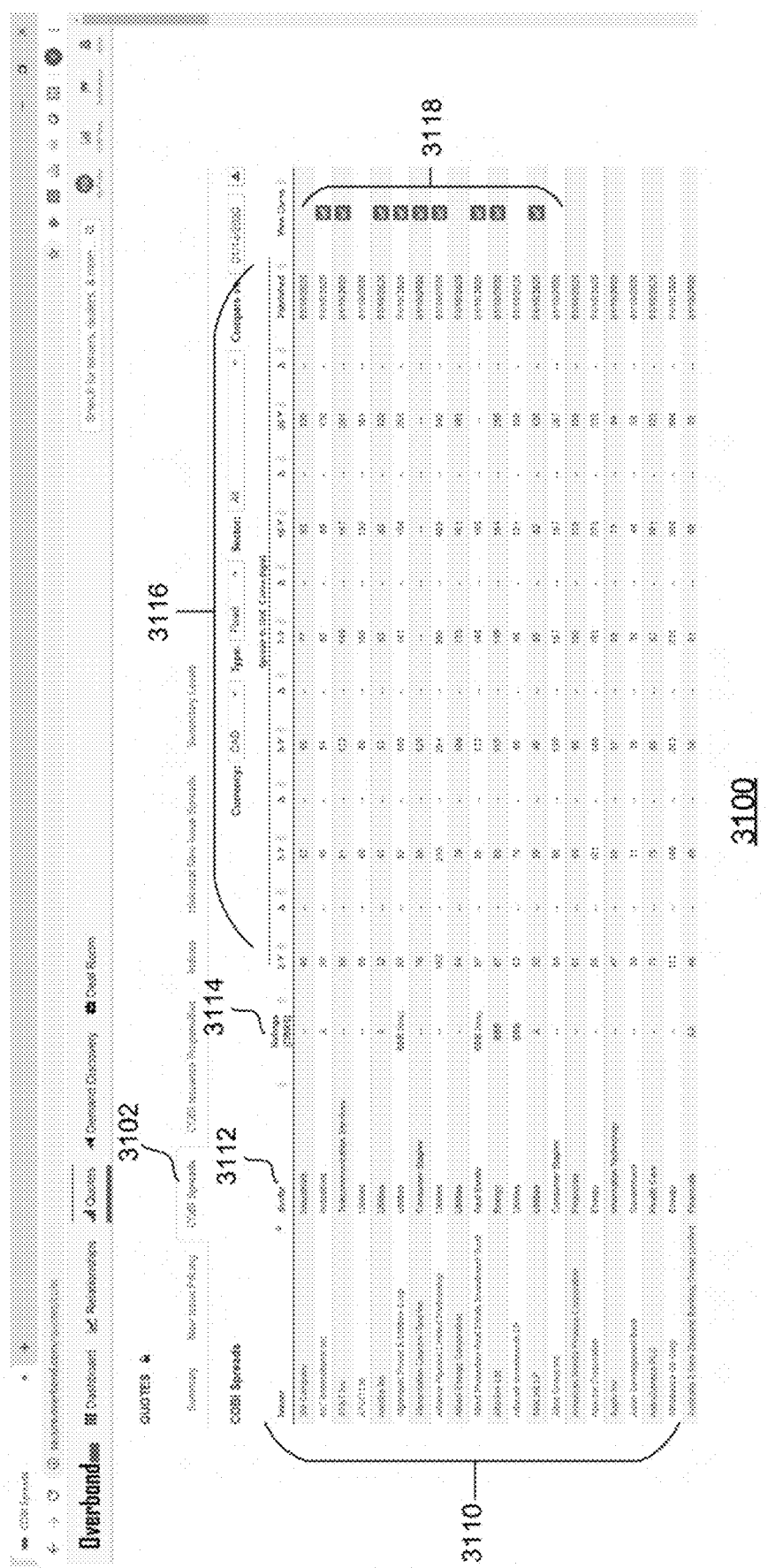
FIG. 2L shows a flow chart outlining exemplary steps implemented by a price analytics engine.

FIG. 2L shows user interface 3100 the pricing spreads for various issuers 3110. As can be seen, each issuer 3110 is associated with a sector 3112, ratings 3114, spread to GoC curve (bps) 3116, and associated curves 3118. User interface 3100 comprises a plurality of user-selectable criteria chosen from a group consisting of time thresholds pertaining to historical data, contemporaneous data, sector, tenor, bond rating, model preference, confidence level and liquidity score, in which a selection indicator e.g. drop-down menu, is associated with the user-selectable criteria and input associated with the selection indicator is received by processor 14 to execute the instructions to at least forecast the pricing of at least one financial instrument, and output at least one of a confidence level and liquidity score associated the forecast.

Figure 2M:
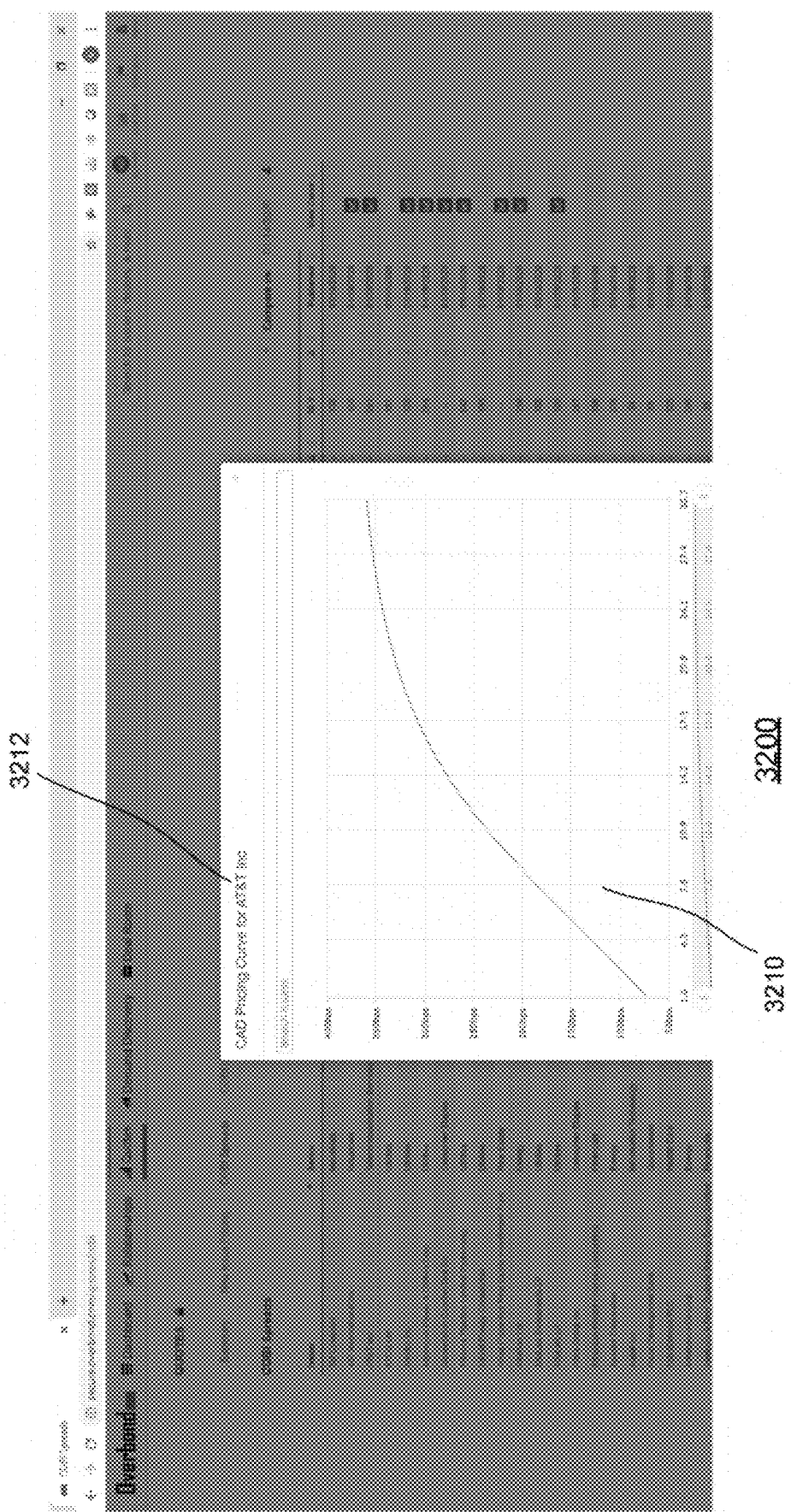
FIG. 2M shows a user interface with a modeled yield curve for a particular issuer.

FIG. 2M shows user interface 3200 with modeled yield curve 3210 for a particular issuer 3212.

Figure 3A:
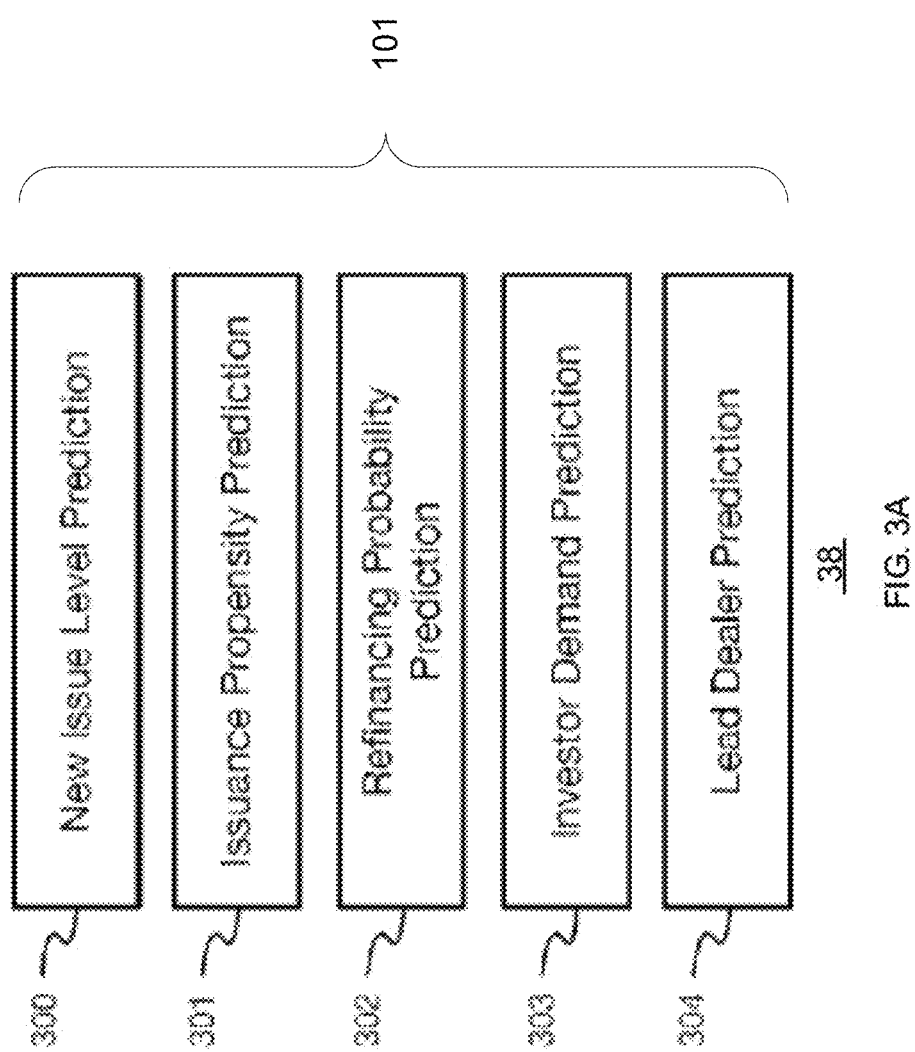
FIG. 3A illustrates a suite of predictive analytics tools that provide users with unique market insights.

FIG. 3A shows predictive issuance analytics engine 38 configured to systematically identify at least one fixed income market opportunity, wherein the at least one fixed income market opportunity comprises at least one financial instrument, and to provide pre-issuance insights into the fixed income market. Accordingly, predictive issuance analytics engine 38 comprises a suite of predictive analytics 101 tools that provides users with unique market insights that are currently not available. Platform 10 utilizes state-of-the-art technologies to provide market insights that users require to gauge market conditions and to participate in the primary market. New Issue Level Prediction 300 uses machine learning technologies on vast sets of data, such as current and historical secondary market trading levels of correlated securities, to predict new issue levels of specific issuers. This predictive analytics tool complements pricing indications produced primarily by dealers to provide an objective, data-driven view of market levels. The machine learning process produce New Issue Level Prediction is illustrated on FIG. 12. Platform 10 utilizes supervised learning methods and aggregates and cleanses data into a structured data sets to extract features 1200 vectors for the purposes of training machine learning algorithms 1201.

Figure 13:
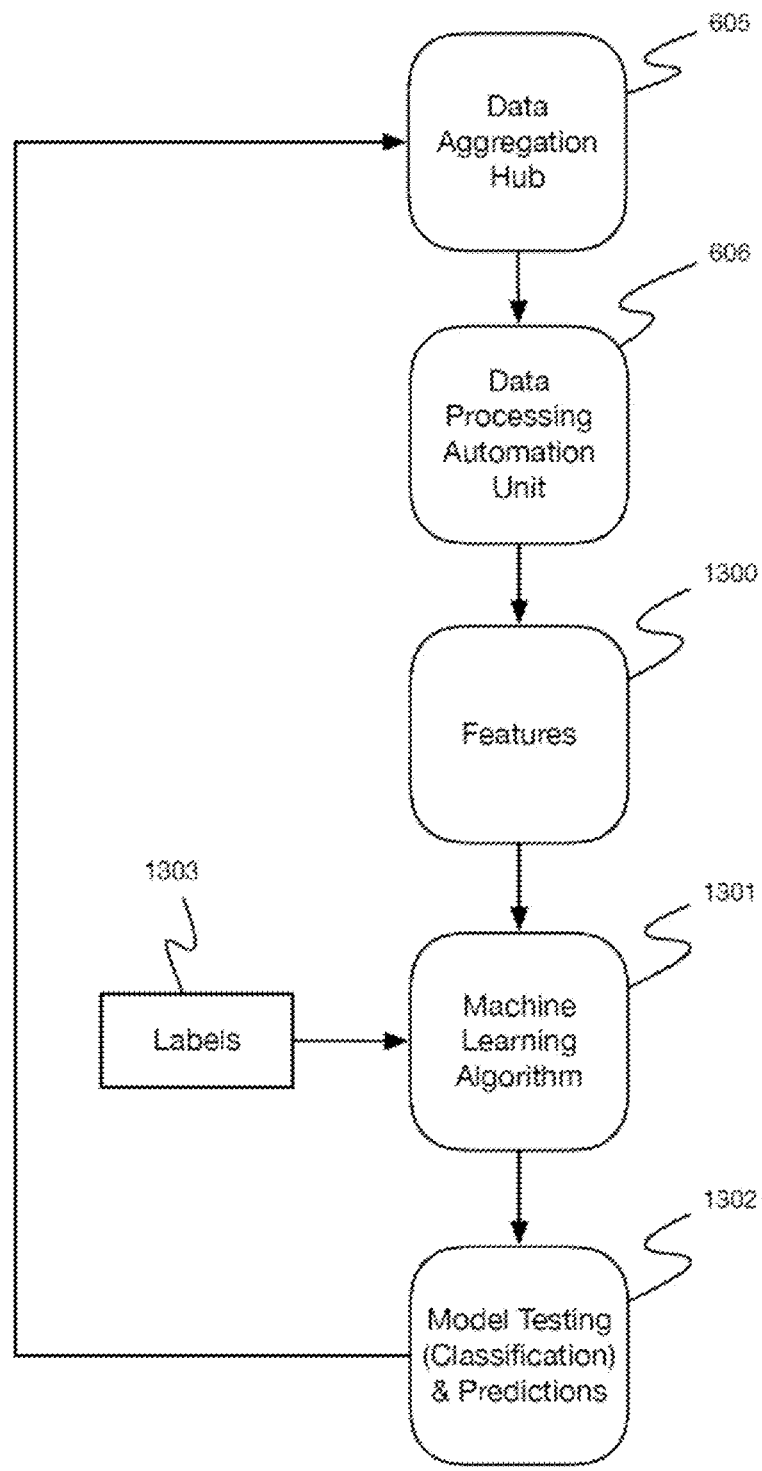
FIG. 13 shows an overview of continuous supervised machine learning process using classification models for the purpose of Lead Dealer Prediction predictive analytics tool.

Examples of features include current and historical levels and details of new securities issuances, current and historical secondary trading levels of bonds, equities, and derivatives, credit ratings, sector information, financial metrics such as leverage ratios, and market indicators. Multiple types of regression models are employed in supervised with feature vectors generated through data aggregation and processing units. This process is iterated on a continuous basis using new feature vectors to test predictions and continuous training of the model. The outputs include theoretical clearing new issue levels for securities, implied secondary levels, and implied new issue premiums. Similarly, Issuance Propensity Prediction 301 tool uses a regression-based machine learning algorithm to predict the propensity of a specific issuer to access the new issue market in a given time horizon. This is particularly useful for dealers looking to focus their efforts on providing investment banking coverage to assist with future offerings; investors looking to focus their human resources on analyzing and engaging with issuers that are likely to issue securities in the near future; and any service providers looking to provide solutions or products geared towards primary market activities can use the results as their sales leads. Refinancing Probability Prediction 302 is a variation of the Issuance Propensity Prediction to provide users with the probability of refinancing occurring for each security coming due in a given period of time. Such information is useful to gauge potential new issue supply over a specified time horizon. Investors holding a maturing security can use this information to participate in the refinancing event. Investor Demand Prediction 303 analyzes datasets supplied into platform 10 as well as generated within platform 10 to provide users, particularly dealers and issuers, with a prediction of potential aggregated investor demand for a specific potential new securities issuance. The machine-learning algorithm uses multiple feature vectors such as recent deal participation metrics, deal types, bond holdings data, investor activities, and market indicators to provide predictive insights. Lead Dealer Prediction 304 employs an algorithm to study historical dealer-issuer relationships such as past deal syndicate structure, lending relationships, and other relevant information to predict the likely dealer to lead the next new issue offered by a specific issuer. Multiple types classification models are trained and tested prior to integrating into platform 10. FIG. 13 illustrates an overview of classification-based model training. Such information is particularly valuable for users looking to select counterparties to engage with, in the context of primary capital market.

Predictive issuance analytics engine 38 comprises machine learning algorithms systematically identify highly likely new bond issuances globally, providing exclusive pre-issuance insights into the fixed income market, identifying new-supply unidentifiable by prior analytical methods. Platform 10 predicts the most optimal indicative new issue, its bond price as well as relative value secondary market bond price for global investment-grade (IG) and high yield (HY) issuers globally, utilizing machine learning (ML) algorithms. Generally, the ML algorithms analyze millions of data points related to factors such as secondary levels, recent indicative new issue price quotations, foreign exchange swap costs, company fundamental data elements, investor sentiment and sector comparable. Additionally, the model scores secondary bonds across predefined currencies e.g. all G10 currencies and prices the cross-currency basis swap in all G10 currency pairs. The total cost benefit is optimized to find cheapest issuance/purchasing price and location. Predictive issuance analytics engine 38 comprises an AI algorithm family which makes ongoing measurements of issuer's propensity to issue bonds, and assigns a score which estimates the relative likelihood a bond issuer will come to market with bonds in the near future. Predictive issuance analytics engine 38 analyzes factors from multiple types of data sources including: bond market data, such as transactions occurring in the secondary market, and historical issuance spreads; investment banking data, such as fundamentals on corporations, their balance sheet indicators, proprietary data sets treasury groups of the corporations themselves had on file such as dealer quotations and trade points; and proprietary data, such as data derived from direct access to large community of issuers and institutional investors via established feedback loops.

In one example, the predictive time horizon the predictive issuance analytics engine 38 in standard use cases is optimized to four weeks. A score is assigned for each company in each potential bond issuance tenor. Scores are on a scale of 0-100 and are relative to other issuers and other bond issuance tenors. A higher score in general means that company is more likely to issue in that tenor compared to a company or a tenor that receives a lower score. High scores (~70-80 or higher) across all tenors imply that an issuer is likely to issue a bond in any tenor. High scores in only one tenor imply that the issuer is more likely to issue in that tenor compared to other tenors. Low scores across all tenors imply that the issuer is less likely to issue in any tenor. The propensity scores are indicative of the probability of issue. For example, a score of 90 means that issuer is in the 90th percentile in a ranking against all other companies in all other issuance tenor possibilities.

Figure 3B:
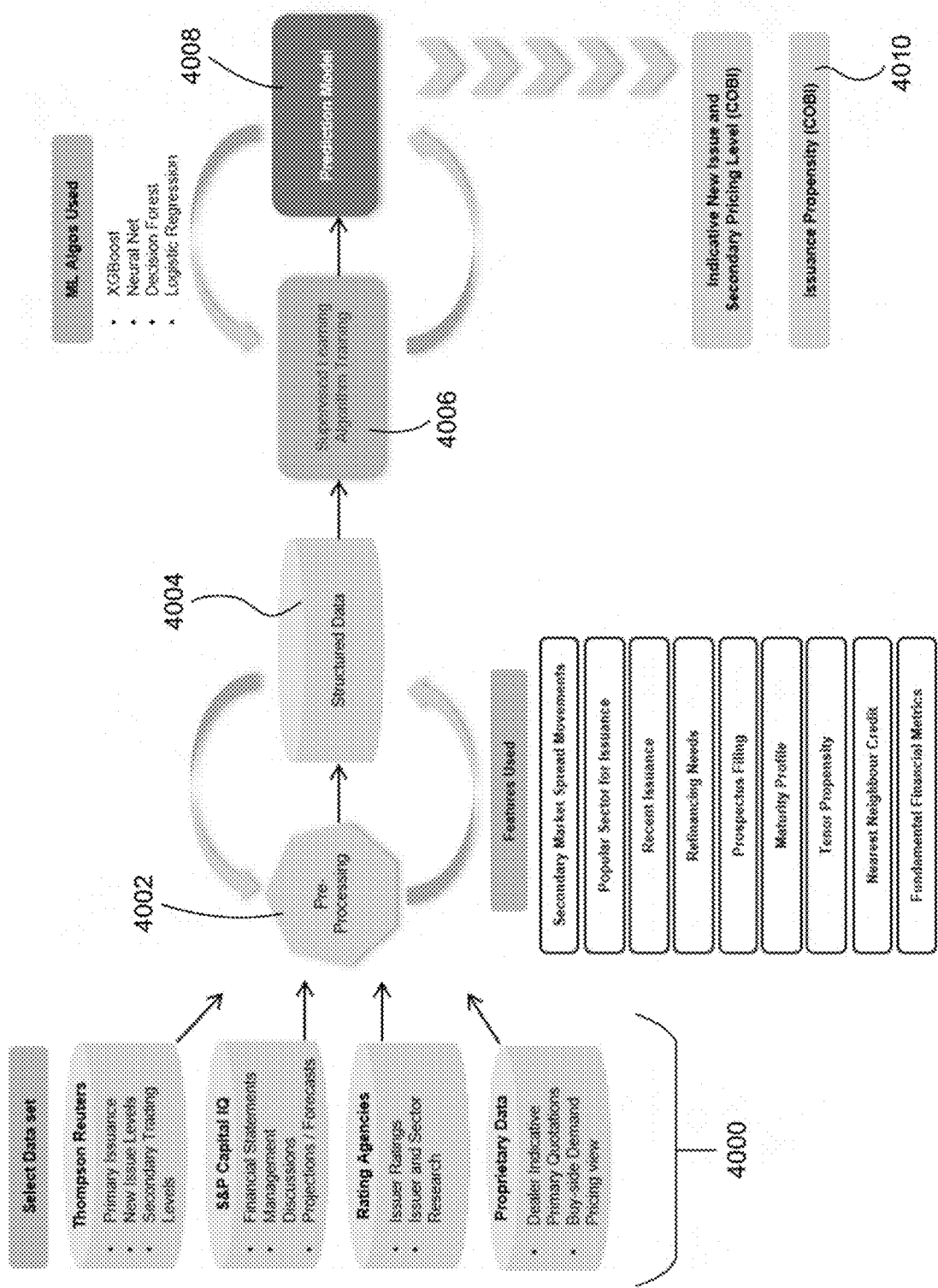
FIG. 3B outlines the exemplary steps of the issuance engine executed by a processor for predicting if an issuer will come to the market and issue bonds.

In more detail, FIG. 3B outlines the exemplary steps of the predictive issuance analytics engine 38 executed by processor 12, for predicting if an issuer will come to the market and issue bonds. A variety of pre-processed inputs are fed into predictive issuance analytics engine 38 algorithms, to predict issuances. For example, the following is a subset of indicators used, namely: Sector Specific Indicators i.e. Spread Compression Relative to Sector: In a situation where the spreads (bond valuations) in a specific sector have compressed relative to other sectors, issuers could capitalize on lower spreads, which translates to lower cost of borrowing, by coming to market and issuing bonds; and Popular Sector for Issuance: Companies in sectors which issue bonds frequently are more likely to issue.

Issuer Specific Indicators comprise recent issuance and refinancing need seasonal/monthly issuance overdue issuance, prospectus filing, spread compression relative to self. With respect to recent issuance, if a company has issued bonds recently, they may be less likely to come to market soon. Predictive issuance analytics engine 38 tracks recent issuances on a monthly time horizon, quarterly time horizon, and yearly time horizon. With respect refinancing need, an issuer's sources of funding and uses of funds are analyzed to determine if an issuer has a need for funding. Generally, issuers are more likely to issue if their funding position is negative. Accordingly, refinancing need is analyzed on a monthly, quarterly, and annual basis.

With respect to seasonal/monthly issuance, if an issuer tends to issue during certain months or seasons, they may continue to follow a similar pattern. An example underlying cause for a pattern in their issuances would be blackout periods.

With respect to overdue issuance, an issuer who regularly issued a certain number of bonds and amount of debt in previous years may issue the same number of bonds and amount of debt in the current year. Deviation from regular issuance pattern in current year versus past years in the sample set is measured and correlations are identified not only with respect to that particular issuer but their sector peer issuers as well.

With respect to prospectus filing, an issuer has recently submitted a prospectus to securities regulators indicating they are seeking to raise capital.

With respect to spread compression relative to self, monitoring if spreads of an issuer have compressed compared to its indicative.

Predictive issuance analytics engine 38 sources raw trading and fundamental data via automated scripts executed at predetermined intervals e.g. every 24 hours (step 4000). The data sources include Thomson Reuters (primary and secondary bond issuance and trading levels, secondary pricing data, outstanding securities, historical bond issuance), S&P Global Market Intelligence (company fundamental data), DBRS, S&P, Moody's, Fitch (company ratings, company credit rating, and macro market data). Thomson Reuters (company sector information), SEDAR (Canada), EDGAR (USA), public filings (prospectus filings), Central Banks/Treasuries, public sources (Macro Market Data), including various other sources. This raw data is pre-processed (step 4002) and the trading data and fundamental data is structured and mapped to the appropriate issuer ID, and stored in databases 27 (step 4004). The data is systematically scrubbed for anomalies and null values. Finally, a set of key input factors are generated based on the raw input. These include but are not limited to factors that measure recent issuance, issuance frequency, maturity schedule gap, propensity for specific tenors (step 4006). These factors are divided between sector and company specific and are used as inputs to the machine learning models.

The structured data is fed into the machine learning algorithm as training data to generate several models (step 4008) to calculate the output propensities. These models are each trained using a subset of the past data, ranging from one month to a maximum of ten years. Multiple supervised machine learning algorithms are trained using past data to predict issuances, such as, XGBoost, Neural Networks, Random Forest, and Logistic Regression model. As an example, the XGBoost algorithm is able to automatically handle missing data values, and therefore it is sparse aware, includes block structure to support the parallelization of tree construction, and can further boost an already fitted model on new data i.e. continued training. For example, an XGBoost classifier may be trained by randomly splitting the training data into three parts or sets: training, validation, and testing, such that 80-90% of the data may be in the training set, 5% may be in the validation set and 15-5% of the data may be in the testing set. The training process may be run iteratively by observing patterns in data and making estimated decisions. The validation set is used to measure accuracy during training and make adjustments (if needed) to correct and improve the modeling complexity for the next iteration. This iterative refinement can then be repeated. The training process may stop when a certain criterion is satisfied. In one embodiment, the stopping criteria is reached as certain errors are minimized. The resulting classifier can then be evaluated, utilizing several performance metrics, (e.g., Area Under Curve of Receiver Operating Characteristic or Precision/Recall curves, minimum per-class accuracy, F1, F2, FN scores, Sensitivity/Specificity, etc.) A proper threshold may then be selected to maximize performance and/or issuance prediction.

Advanced sampling techniques were used to account for class imbalance between positive (will-issue) and negative (will-not-issue) predictions). Finally, the results are back-tested against the entire ten years of data and measured for precision and recall metrics. Predictive issuance analytics engine 38 uses a robust ensemble method to combine the results from each algorithm and generate an output score. This score represents the propensity of an issuer to issue a bond in a specific tenor i.e. a propensity score (step 4010).

As an example, predictive issuance analytics engine 38 outputs issuance propensities for each tenor (2, 3, 5, 7, 10, and 30 years) for each issuer and in each currency that they issued in before. Predictive issuance analytics engine 36's propensity score represents 'Likelihood To Issue' in next 4 to 6 weeks and is outputted with strongest underlying market signals that contributed overall to algorithm issuance recommendation.

Figure 3C:
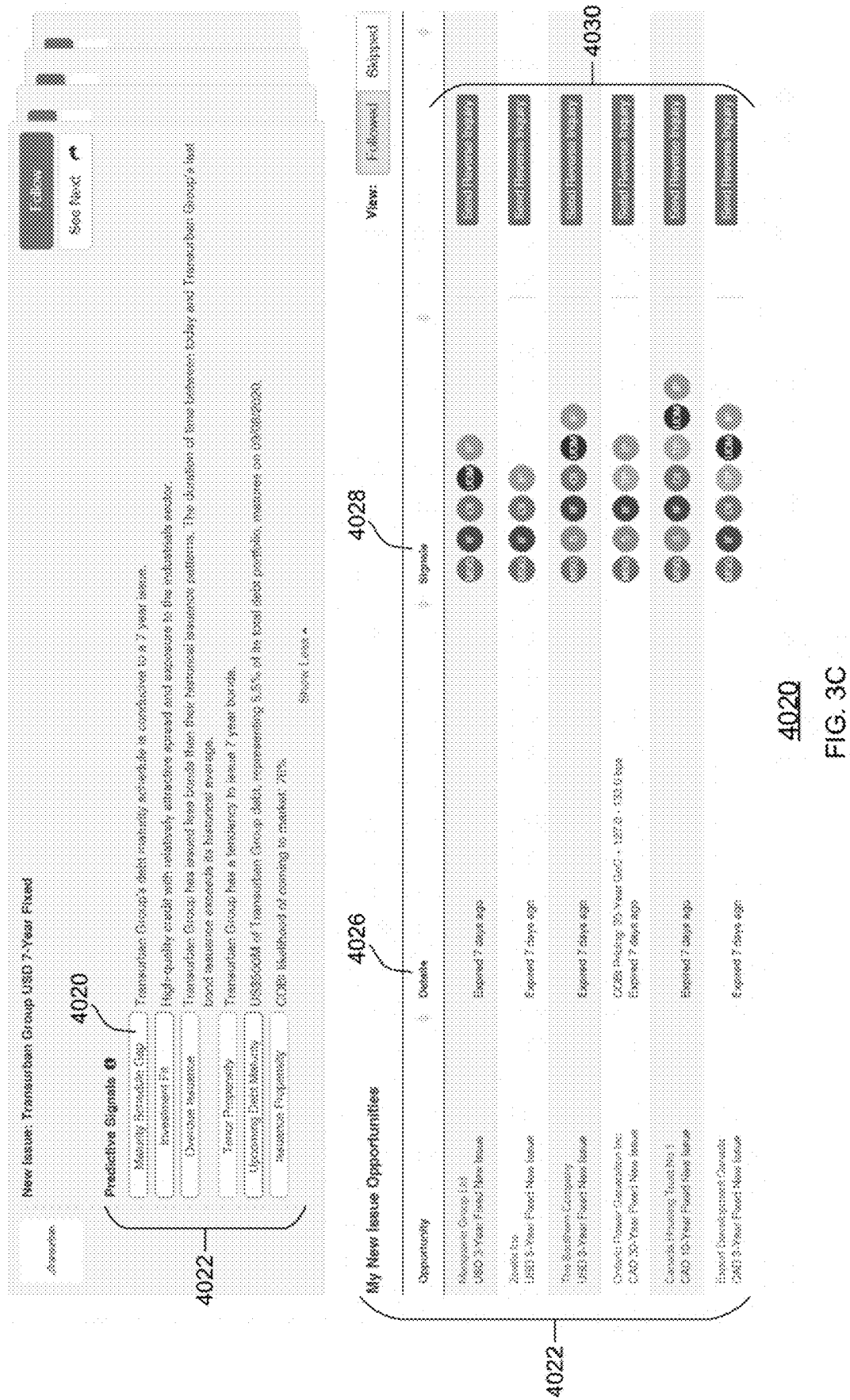
FIG. 3C shows an example of an output issuance recommendation for one issuer, exposing underlying feature importance.

FIG. 3C shows exemplary user interface 4020 with an output issuance recommendation for one issuer. User interface 4020 comprises prediction signals 4022 for a new issue, such as, maturity schedule gap, investment fit, overdue issuance, tenor propensity, and upcoming debt maturity and issuance propensity. Prediction signals 4022 indicate the underlying reasons behind the score associated with the particular issuer. A list of new opportunities 4024, including expiration data 4026, prediction signals 4028 and reverse inquiry buttons 4030, are also presented.

Figure 3D:
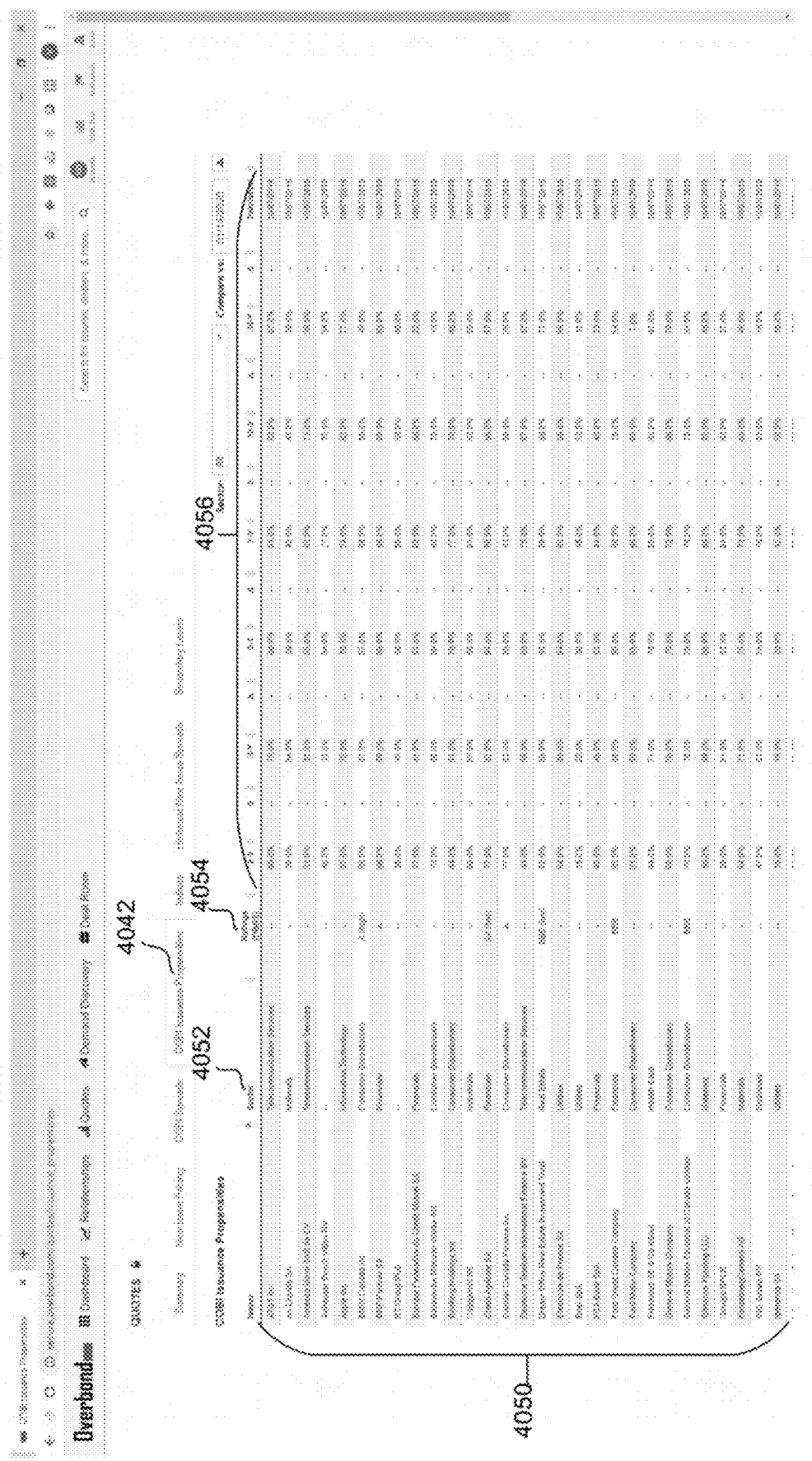
FIG. 3D shows a sample dashboard for tracking multiple issuance opportunities on the platform and a sample of the table nomenclature exposed via an API for continuous data download.

FIG. 3D shows exemplary user interface 4040 with sample dashboard comprises issuance propensities tab 4042 for tracking multiple issuance opportunities on platform 10. As can be seen, each issuer 4050 is associated with a sector 4052, ratings 4054, and issuance prediction 4056. User interface 4040 comprises a plurality of user-selectable criteria chosen from a group consisting of time thresholds pertaining to historical data, contemporaneous data, sector, tenor, bond rating, model preference, confidence level and liquidity score, in which a selection indicator e.g. drop-down menu, is associated with the user-selectable and input associated with the selection indicator is received by processor 14 to execute the instructions to at least forecast the time frame for an issuance of at least one financial instrument, and the issuance propensity for at least one financial instrument, and output at least one of a confidence level and liquidity score associated the forecast.

Figure 3E:
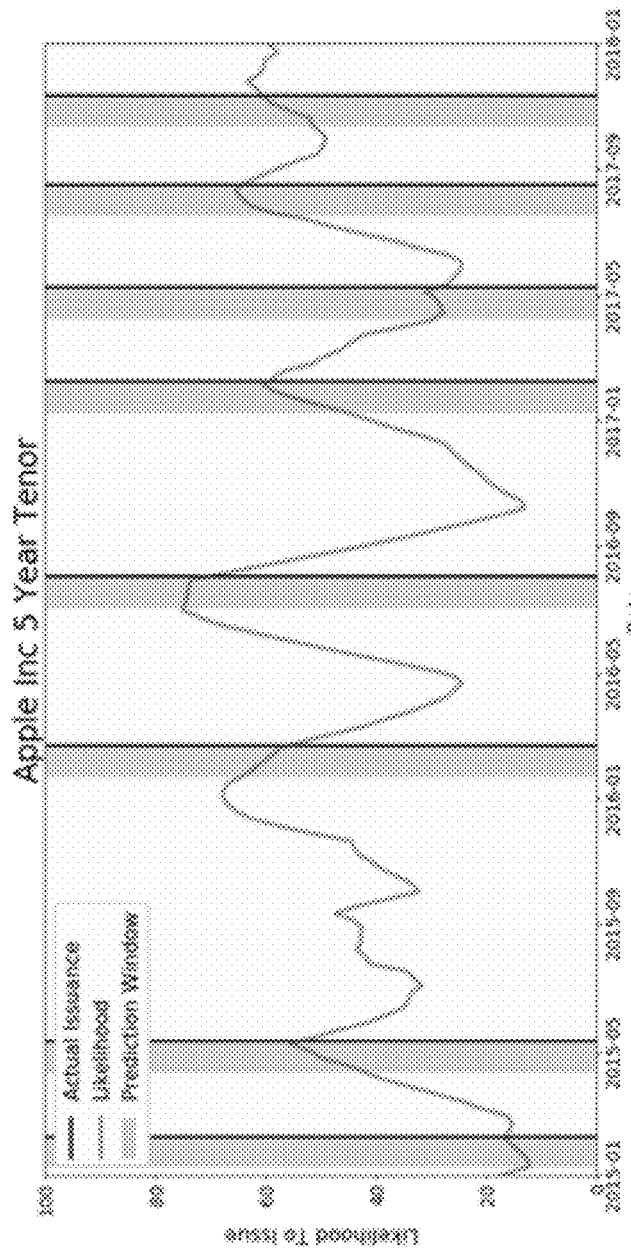
FIG. 3E shows a sample back-tested performance of the algorithms of the issuance engine, plotting predictions for a specific issuer to issue bonds in a specific tenor, in one example.

FIG. 3E shows a sample back-tested performance of the algorithms of predictive issuance analytics engine 38, plotting predictions for a specific issuer to issue bonds in a specific tenor, in one example. Propensity values are plotted over time, with black bars representing when actual issuances have occurred. The gray area trailing each issuance on the first graph indicates the issuance prediction window. In this example, the default time horizon for the propensity issuance prediction is four weeks, however, the time horizon may be adjusted as desired.

Figure 3F:
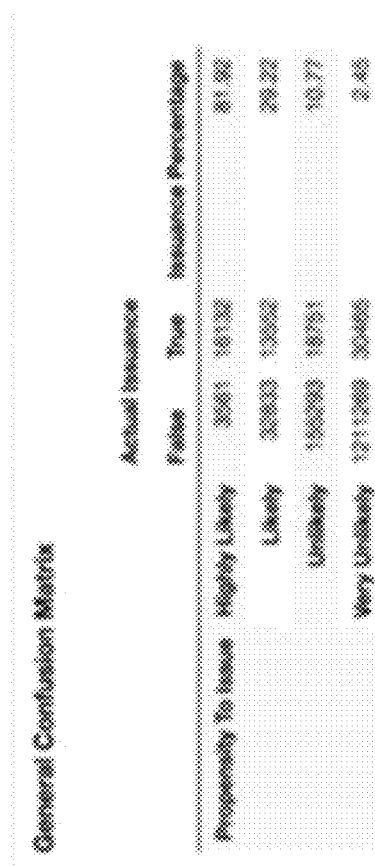
FIG. 3F shows the overall result predictions categorized in 4 buckets: Highly Likely to Issue, Likely to Issue, Unlikely to issue and, Very unlikely to Issue.

Taking above specific issuance prediction back-test, a further systematic back-test on a basket of 600 issuers is performed, testing 6 standard issuance tenors for 500 weeks, representing around 1.1 million predictions. For each issuer and every tenor predictive issuance analytics engine 38 calculated likelihood to issue every week. The overall result predictions were categorized in 4 buckets: Highly Likely to Issue, Likely to Issue, Unlikely to issue and Very unlikely to Issue. As can be seen in the table of FIG. 3F, the majority of issuers/tenors that algorithm predicted as being highly likely to issue did in fact issue, above 81% precision. Similarly the vast majority of the issuers/tenors that algorithm predicted as being very unlikely to issue did not issue. This is true for all issuer industry sectors and in general.

Figure 3G:
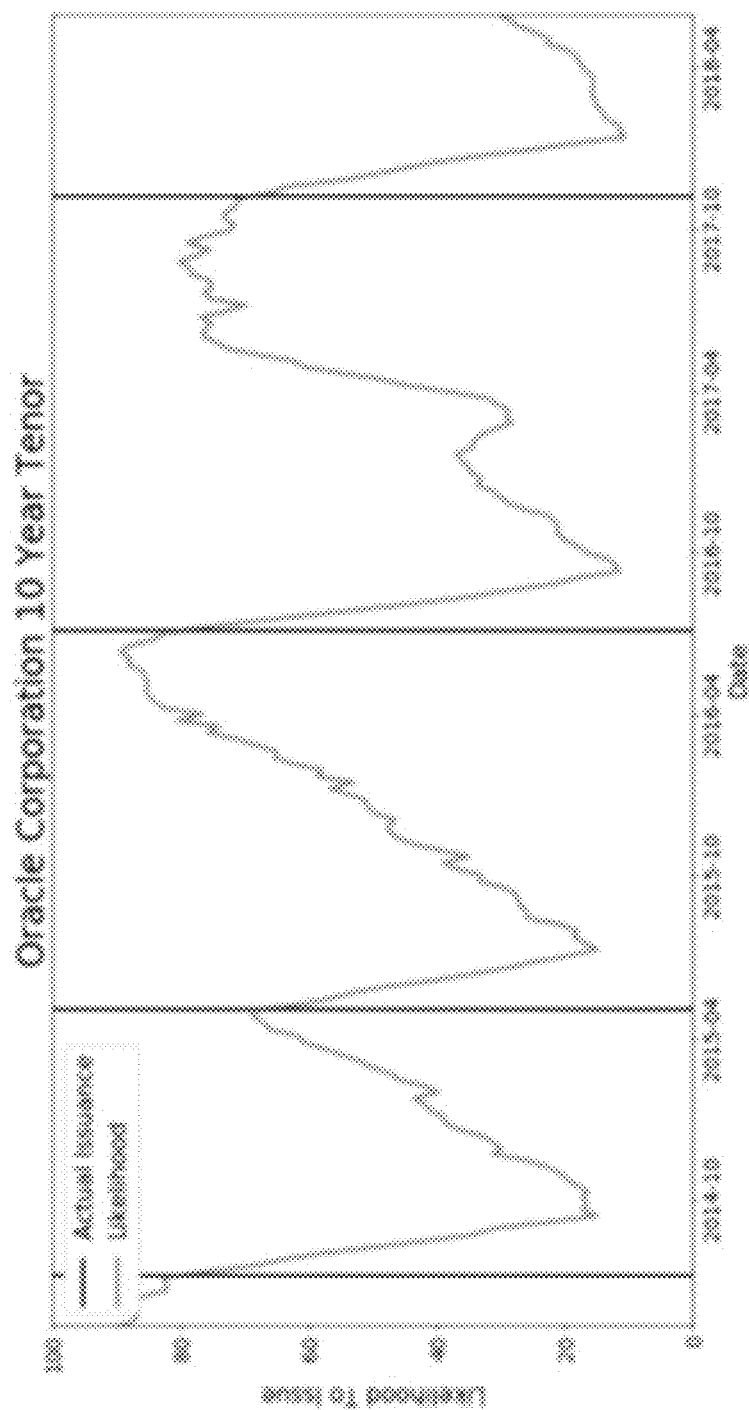
FIG. 3G shows an output graph for the historical propensity for a single issuer and single tenor prediction, with the time across the x-axis, and the propensity score on the y-axis labeled as 'Likelihood To Issue'.

Furthermore, the propensity output may be presented in two formats: historical and current. Historical propensity is given as a separate time series going back two to five years for each tenor. (2, 3, 5, 7, 10, and 30 years) for each issuer. FIG. 3G shows an output graph for the historical propensity for a single issuer and single tenor prediction, with the time across the x-axis, and the propensity score on the y-axis labeled as 'Likelihood to Issue'. The graph also shows black vertical bars at the dates where that issuer actually issued in a given tenor.

Current propensities can be supplied on a weekly basis, although frequency can be scaled according to a client use case need. For example, pre-deal analytics applications in investment banking usually require one month or longer time horizon models optimization while use cases in fixed income trading world often entail model optimizations that are as close to real-time as possible. In addition, platform 10 exposes underlying factors which would be commonly understood by analysts to contribute to a propensity score at any given time. Breaking down the propensity scores into more detailed categories, factors include: Upcoming Maturity; Average Maturities per Year; Overdue Issuance: Popular Sector for Issuance: Recent Issuance, etc. In none example, predictive issuance analytics engine 36 comprises a non-linear, non-parametric algorithm, and the overall propensity scores are not directly proportional to a weighted average of the sub-scores. These sub-scores are intended to give a deeper level of explain-ability to the indicators used to derive the propensity scores.

Figure 3H:
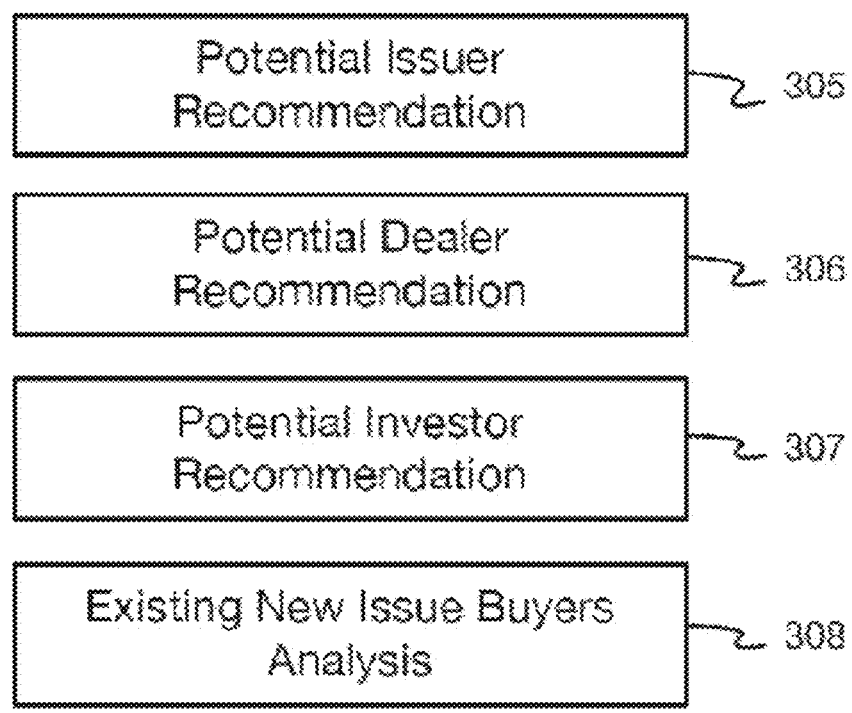
FIG. 3H illustrates a discovery and matching engine configured to match at least one target institutional buyer with the fixed income market opportunity.
Figure 31:
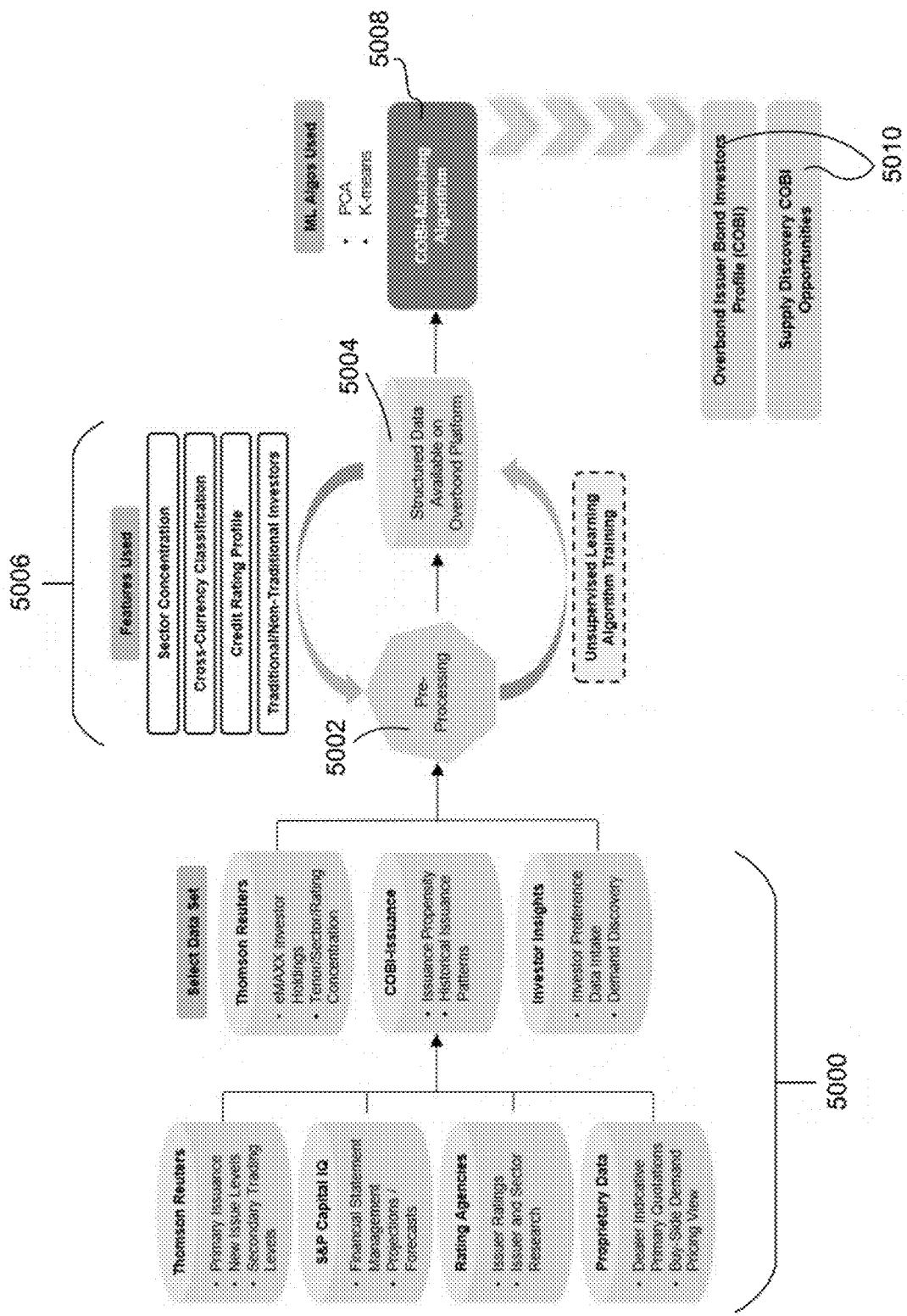

FIG. 3H illustrates matching and discovery engine 38 configured to match at least one target institutional buyer with the fixed income market opportunity. Similarly, Potential Issuer Recommendation 305, Potential Dealer Recommendation 306, and Potential Investor Recommendation 307 provides users with the ranking of relevant counterparties to potentially engage with, given a set of criteria such as product specialties, capabilities, demand, and investment track records. For example, a new securities issuer can use the Potential Investor Recommendation 307 tool to generate a list of investors that are likely to invest in the issuer's new offering, based on data-driven predictions. Platform 10 provides both explicit rule-based recommendations as well as recommendations based on algorithm trained through supervised training. Furthermore, the Existing New Issue Buyers Analysis 308 tool allows users, specifically issuers and dealers, to upload the buyer list of historical new issues. Platform 10 analyzes the buyer list and provides an optimized list of potential investor matches. The optimization is configurable based on pre-determined feature vectors to arrive at the most relevant matches. The result uses a system that also incorporates public information such as investor holdings, investor mandates and sector preferences, and investor historical new issue participation patterns.

In more detail, discovery and matching engine 38 provides analytics platform for issuers, dealers and investors to discover traditional and non-traditional buyers for new bond issuances as well as profiling pricing tension in secondary market and risk appetite for target buyers, enabling systematic opportunity monitoring and market signal alerts.

Discovery and matching engine 38 employs algorithmic matching of target buyers with fixed income opportunities, based on past buying patterns, portfolio manager preferences, rebalancing events and preferred industry sector, rating or tenor. Discovery and matching engine 38 is an advanced AT algorithm family which makes ongoing observations of investor behavior, buying-patterns and rebalancing events, and identifies a set of traditional and non-traditional buyers for each market credit opportunity. Discovery and matching engine 38 analyzes features focusing on data variables below:

sector concentration: An investor with higher transaction volume and/or larger holdings in a specific industry sector is ranked higher when matching opportunity has issuer from the same sector. For example, if issuer is in the energy sector, opportunity is more likely to be matched with an investor who recently executed larger number of transactions in energy bonds;

cross-currency classification: discovery and matching engine 38 considers the currency in which the investor's holdings are denoted as a ranking criterion. Investors who hold higher levels of GBP securities for example are ranked higher if the trade opportunity identifies issuer who is also expected to issue GBP denominated bonds;

credit rating profile: Discovery and matching engine 38 gauges an investor's risk tolerance by considering the quantity of investment-grade to high-yield bonds in the investor's portfolio. Issuers with lower credit ratings are more likely to be matched with investors whose portfolios hold more high-yield securities, and traditional/non-Traditional Investors: An investor with continuous holdings and prior transactions in bonds of the corresponding issuer is labelled as a traditional investor for opportunities of that issuer (credit type, currency, rating, industry sector). Investors without this past buying pattern are considered non-traditional.

In one example, discovery and matching engine 38 analyzes more than 2,900 investors' portfolios and ranks the investors' interest based on their existing holdings and quarterly rebalancing. Using the algorithms, issuers or dealer underwriters acting on their behalf can systemically identify investors who are traditional and non-traditional buyers.

In more detail, FIG. 3I outlines the exemplary steps of the discovery and matching engine executed by processor 12, for identifying a set of traditional and non-traditional buyers for each market credit opportunity.

Discovery and matching engine 38 sources raw trading and fundamental data via automated nightly scripts (step 5000). This raw data is pre-processed (step 5002) and the trading data and fundamental data is structured and mapped to the appropriate issuer ID, and stored in databases 27 (step 5004). The data is systematically scrubbed for anomalies and null values. Finally, a set of key input factors are generated based on the raw input. These include but are not limited to factors that measure sector concentration, cross-currency classification of different investor types, credit rating profile investor preference and traditional/non-traditional investors (step 5006). Discovery and matching engine 38's primary additive data input is eMAXX Investor holdings data sourced from Thomson Reuters. Discovery and matching engine 38 sources raw data from major data suppliers in the financial sector, including Thomson Reuters, S&P Global Market Intelligence, major credit rating agencies, proprietary sources, as well as other sources. The data that discovery and matching engine 38 algorithms use includes the following: eMAXX Investor Holdings Data, Investors, Investor Insights Campaign, Secondary Pricing Data, Outstanding Securities, Historical Bond Issuance, Fundamental Data, Issuer Credit Rating, Industry Sector Information, Prospectus Filings and Macro Market Data. A data refresh is performed quarterly and an algorithm monitors any changes in the investors' holdings data table. eMAXX data bundles provide issuer/investor data, security classification, and credit rating data which are pre-processed before they are inputted into the algorithm.

The subsequent stage for the machine learning algorithm is to train and apply several models to calculate the output investor relative match scores. These models are each trained using a subset of the past data, ranging from one month to a maximum of ten years (step 5008). In one example, feedback loops for machine learning are established through investor insights campaign that runs monthly and sources on average 4 billion USD in non-executable investor credit preferences (across corporate, sovereign, supra-sovereign, municipal and provincial issuer credit). The results are back-tested against the entire ten years of data history and measured for precision and recall metrics, and issuer bond investors profile and the supply discovery opportunities are outputted (step 5010).

Figure 3J:
FIG. 3J shows a user interface with bond buyer matching results.

In addition, discovery and matching engine 38 ranks each investor depending on their likelihood of investing in a security with the predefined criteria. FIG. 3J shows user interface 5100 showing bond buyer matching results from discovery and matching engine 38, accessed via actuation of tab 5102. The ranking is based on the quantity the investor 5104 currently has invested based on the inputted criteria, number of prior transactions in relevant category, and notional size of purchasing activity, shown generally as

5106. As an example, an investor with high amount of USD bonds in their portfolio will be ranked higher when the issuance opportunity is USD denominated. The investor rank 5108 (outputted as number of stars beside investor organization name 5104) represents the quintile in which the investor ranks after discovery and matching engine 38 ranking algorithm finished the analysis (i.e. an investor in the upper quintile will show five stars while an investor in the lower quintile will show one star).

Using issuer credit type characteristics, discovery and matching engine 38 first identifies investors who are traditional buyers. Once these investors are identified and ranked, algorithms identify non-traditional buyers based on currency, rating or industry sector buying preferences. Each prospective investor is ranked based on the contents of their portfolio, frequency of their buying patterns, expressed preferences and rebalancing.

User interface 5100 comprises a plurality of user-selectable criteria chosen from a group consisting of time thresholds pertaining to historical data, contemporaneous data, sector, tenor, bond rating, model preference, confidence level and liquidity score, in which a selection indicator e.g. drop-down menu, is associated with the user-selectable criteria and input associated with the selection indicator is received by processor 14 to execute the instructions to at least identify a set of traditional and non-traditional buyers for each market credit opportunity, rank the investor, and output at least one of a confidence level and liquidity score associated with the identification and the ranking.

Figure 4:
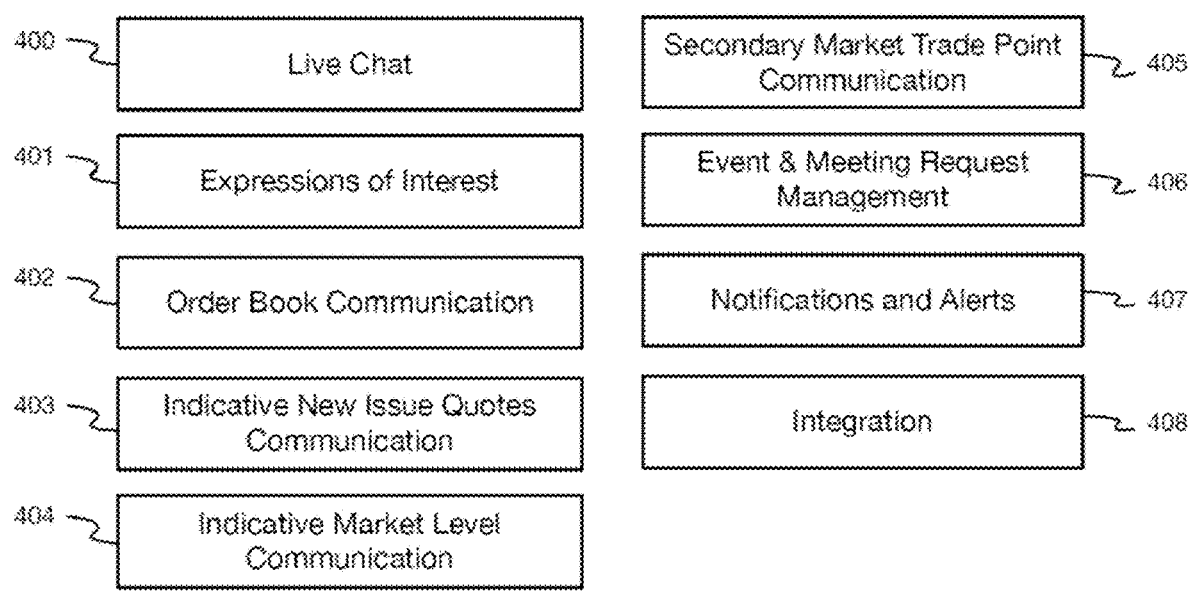
FIG. 4 illustrates a suite of communication tools that provide users with multiple, user-friendly, channels of communications.

FIG. 4 provides an overview of various communication tools 102 that provide users with multiple, user-friendly, channels of communications. The Live Chat 400 module allows users to communicate instantly with other users on platform 10. The module provides secure communication over HTTPS and may include end-to-end encrypted messaging services. Platform 10 is also offered through a Single Page Application interface, which allows for advanced notification and chatting capabilities. For example, users are able to have multiple chat boxes within associated web pages of platform 10. This is particularly useful as users are able to communicate seamlessly without leaving a page, staying within the context of each workflow. The Live Chat 400 module also supports group chatting to facilitate multi-user meetings such as syndicate group meetings. The Expression of Interest 401 tool, is an invention that allows users to communicate pre-deal interests ("Reverse Inquiries") with each other. Specifically, investor users are able to select target issuers, fill in inquiry details such as tenor, interest size, structure, currency, pricing levels, expiry date, and others. Users with pre-approved permissions are also able to create Reverse Inquiries on behalf of other users. For example, an issuer user may receive a Reverse Inquiry through the form of electronic email. They may forward the electronic mail to a secure mailbox maintained by platform 10—the Reverse Inquiry will be logged on the platform for recordkeeping purposes. Similarly, dealer users may act on behalf of their clients on both investor and issuer side to reflect latest developments. Users are also able to see a clear audit trail of creation of digital Reverse Inquiries and any modifications. Users are also able to communicate through a secure channel with the appropriate counterparties. Investor users have the option to submit Reverse Inquiries anonymously and may share the inquiry details with dealers intermediating the potential new issue. All platform 10's specific features are customizable subject to a user's permissions. These permissions are determined from the various regulations applicable to a given user, and thus prevent users from performing certain activities. Order Book Communication 402 allows users to securely communicate the state of a live or closed order book with other relevant counterparties. This is an essential part of the book building process. Indicative New Issue Quotes Communication 403 and Indicative Market Level Communication 404 modules enable various types of all-to-all market intelligence communication as stated for Digital New Issue Level Indications 200. Platform 10 allows for privilege controls for internal team members. For example, platform 10 can be configured so that a Debt Capital Markets Analyst (dealer user) may only publish Pricing Indications for a specific list of issuer clients. Secondary Market Trade Point Communication 405 allows users to upload, manage and communicate their trading activities with their counterparties. Further, the Event & Meeting Request Management 406 tool, another embodiment of the invention may include a digital tool to request and schedule meetings with counterparties in the primary capital market. Notifications and Alerts 407 is a built-in system that allows users to seamlessly be alerted through a variety of channels including, but not limited to, in-application notification and alerts, email notifications, Short Message Service (SMS) messages, and automated phone message. The notification management system allows for both internal and external events tracking, customizable cadence, and automatic subscription based on user roles through integration with permission access control. Lastly, platform 10 enables multiple Integration 408 capabilities for all modules. Examples of integration includes the following: Outlook® email software integration, chat channel integration with client-side servers, and data integration with client-side servers via APIs.

Figure 5:
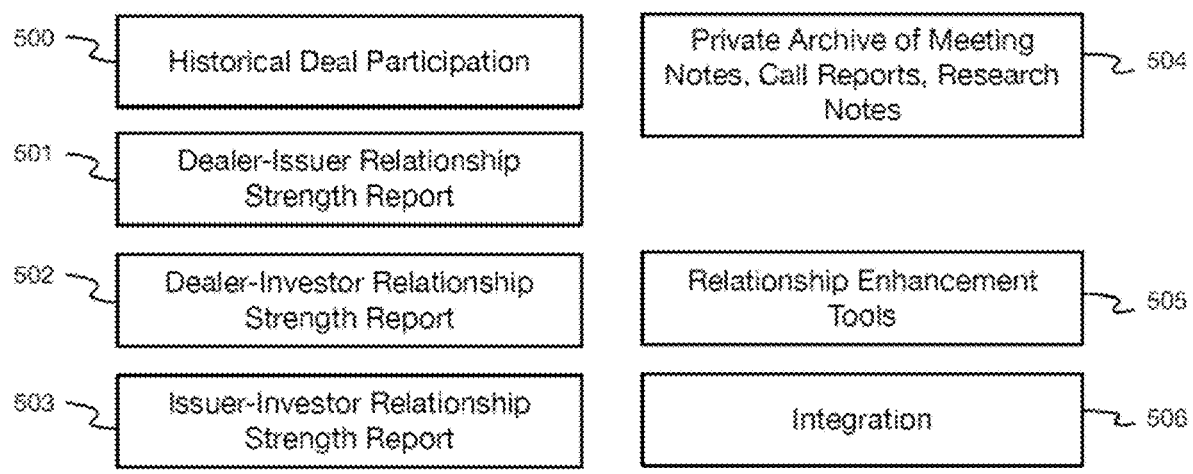
FIG. 5 shows an overview of the suite of relationship management tools.

Referring to FIG. 5, an embodiment of the invention includes a suite of relationship management 103 tools. A user of platform 10 is able to manage aspects of relationships with counterparties on platform 10. Through the Historical Deal Participation 500 tool, users track historical records of deal participation using a private database management system. Through Dealer-Issuer Relationship Strength Report 501, Dealer-Investor Relationship Strength Report 502, and Issuer-Investor Relationship Strength Report 503 modules, a system user can gauge the state of the relationship maturity with a given primary market counterparty. For example, an issuer user may generate a multi asset class capital markets relationships report to analyze the overall relationship summary and scoring with each of its dealer counterparts. Similarly, an investor user may generate a multi asset class capital markets relationship report to analyze the overall relationship summary and scoring with each of its dealer counterparts. Private Archive of Meetings, Call Reports, and Research Notes 504 may be maintained by users to streamline recordkeeping and financial analysis. Relationship Enhancement Tools 505 promote fostering good relationships between dealers, investors and issuers through communication channels, such as email and messaging. Lastly, platform 10 enables multiple integration 506 capabilities for all modules. Such integration includes the following: Outlook® email software integration, chat channel integration with client-side servers, data integration with client-side servers via APIs.

Figure 6:
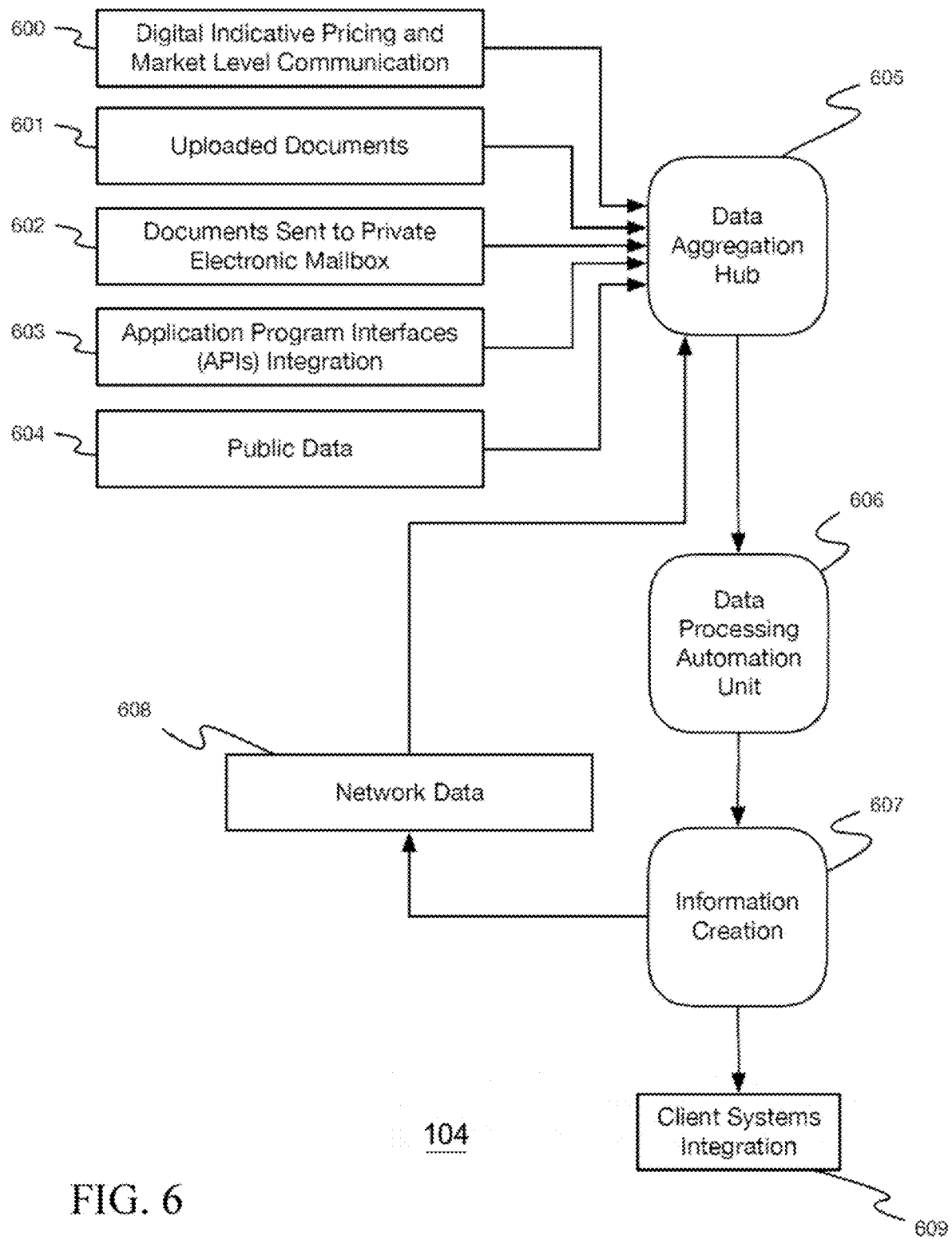
FIG. 6 shows an overview of systems to aggregate, process, and integrate data from multiple sources into and out of a centralized data aggregation and processing, in the context of primary capital markets.

FIG. 6 is an overview of systems to aggregate, process, and integrate data from multiple sources into and out of a centralized data aggregation, management, and processing 104, in the context of primary capital markets. Platform 10 relies on abstract APIs and a data feed consuming pipeline capable of interoperating with multiple capital market feeds real-time. Furthermore, market data is stored and cached, with millions of data points in a unified document architecture. Platform 10 contains a corresponding database/document architecture and caching layer for the persistence of serving market data to internal application components. Further, platform 10 may employ Redis™ software clusters with multiple replicas to minimize web latency. Internal application abstraction from market data feeds is achieved through an internal micro-services architecture. Verification of federated data scalability is achieved through load-testing for both concurrent users and data volumes. Data Aggregation Hub 605, which interfaces with multiple data providers including Digital Indicative Pricing and Market Level Communication 600, Uploaded Document 601, Documents Sent to Private Electronic Mailbox 602, Application Program Interfaces 603, and Public Data 604. As well, Network Data 608, metadata generated by the usage of platform 10 is transmitted back into the Data Aggregation Hub 605 to further enrich data quality and supply information needed for various predictive analytics modules. Data Processing Automation Unit 606 formats, filters, and reconciles records prior to being transmitted for use by system users via Information Creation 607. In addition, advanced natural language processing techniques may be utilized to synthesize, extract keywords (for example, unique identifiers, company name), perform sentiment analysis, and extract transaction related terms such as covenants and legal term definitions. Platform 10 allows for Client Systems Integration 609, providing the ability to synchronize datasets with users' internal systems through secure application program interfaces.

Figure 7:
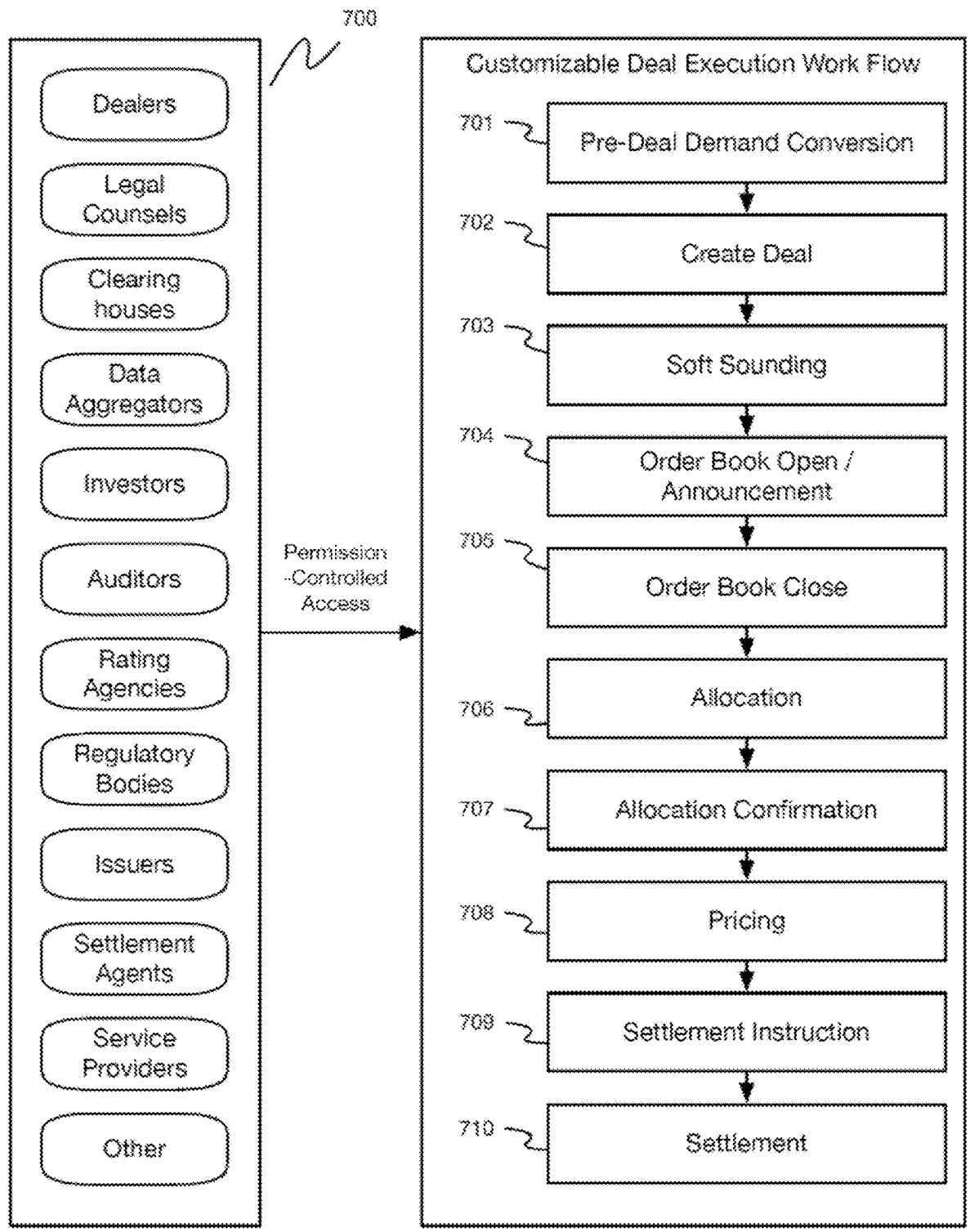
FIG. 7 shows an overview of customizable digital deal execution workflow with permission-controlled access provided to multiple stakeholders.

FIG. 7 is an overview of a customizable digital deal execution workflow 110 with permission-controlled access provided to multiple stakeholders 700. In embodiments of the invention, Pre-Deal Demand conversion 701 is a step-by-step process that allows the issuer and/or dealer to Create Deals 702 and populate it with existing Reverse Inquiries and continue the process of gauging interest by Soft Sounding 703, Opening an Order Book 704, Closing Order Book 705, Allocating 706, Allocation Confirmation 707 with Investors, Pricing 708 and confirming Settlement Instruction 709 to reach settlement 710. The deal execution module provides highly customizable deal execution workflow and permission sets for different users.

Figure 8:
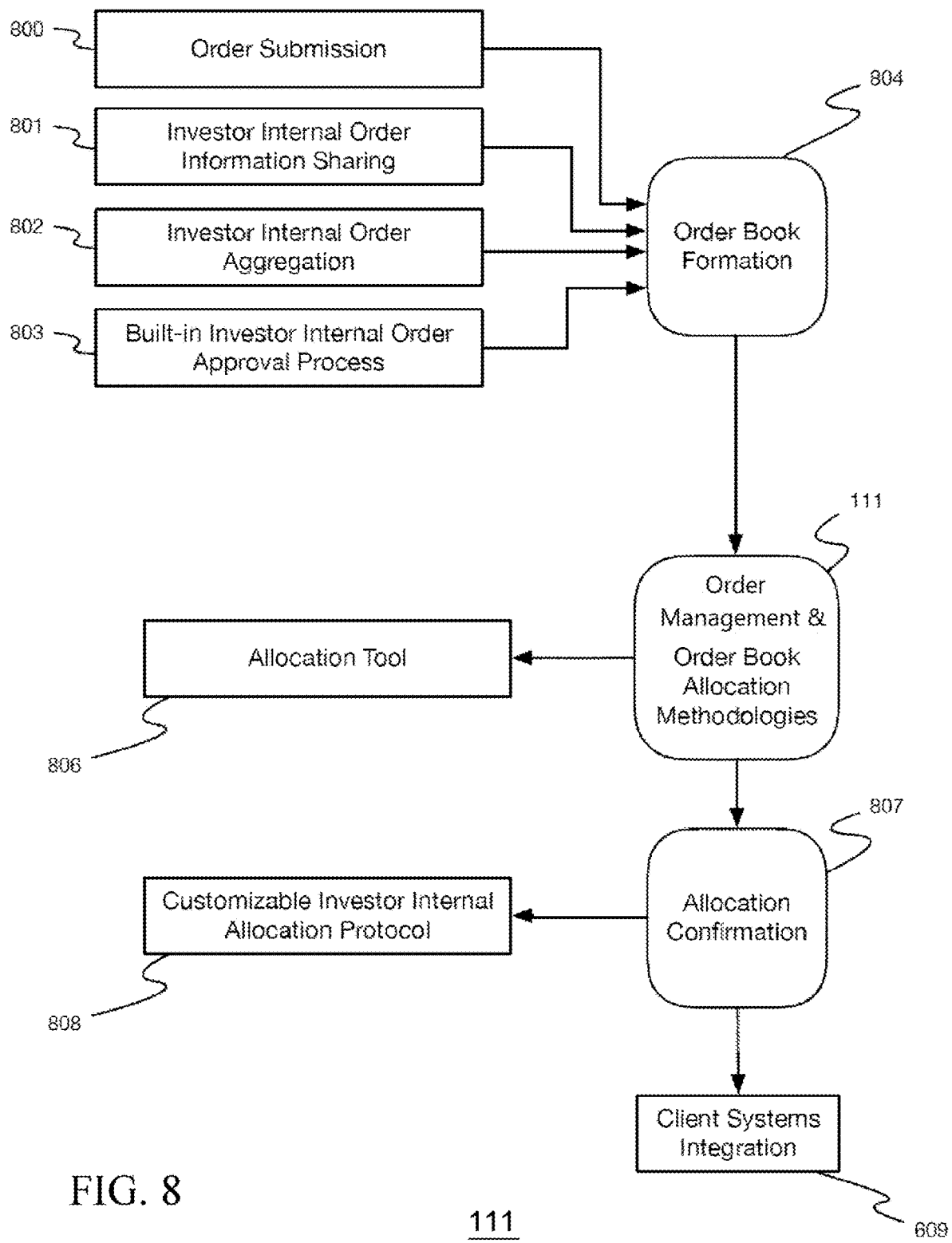
FIG. 8 shows an overview of digital order book management and allocation systems.

Referring to FIG. 8, embodiments of the invention may include a module that applies Customizable Proprietary Order Book Allocation Methodologies 111 to manage and allocate order books. An order book may be populated by investor and dealer users through the Order Submission 800 interface. Investors may share order information internally to aggregate orders from multiple portfolio managers and to facilitate a streamlined order approval process 801, 802, 803 for Order Book Formation 804. Algorithm used for the Allocation Tool 806 may use information such as order size, relationship strength report, predictive metrics, and order submission time to provide suggested allocation amounts for each order. The Allocation Confirmation 807 tool may include real-time, two-way communication between the syndicate and investors to maintain the latest status of the order book. The tool may be extended to include an investor-side internal allocation protocol 808 to further allocate the new issue within an investor organization.

Figure 9:
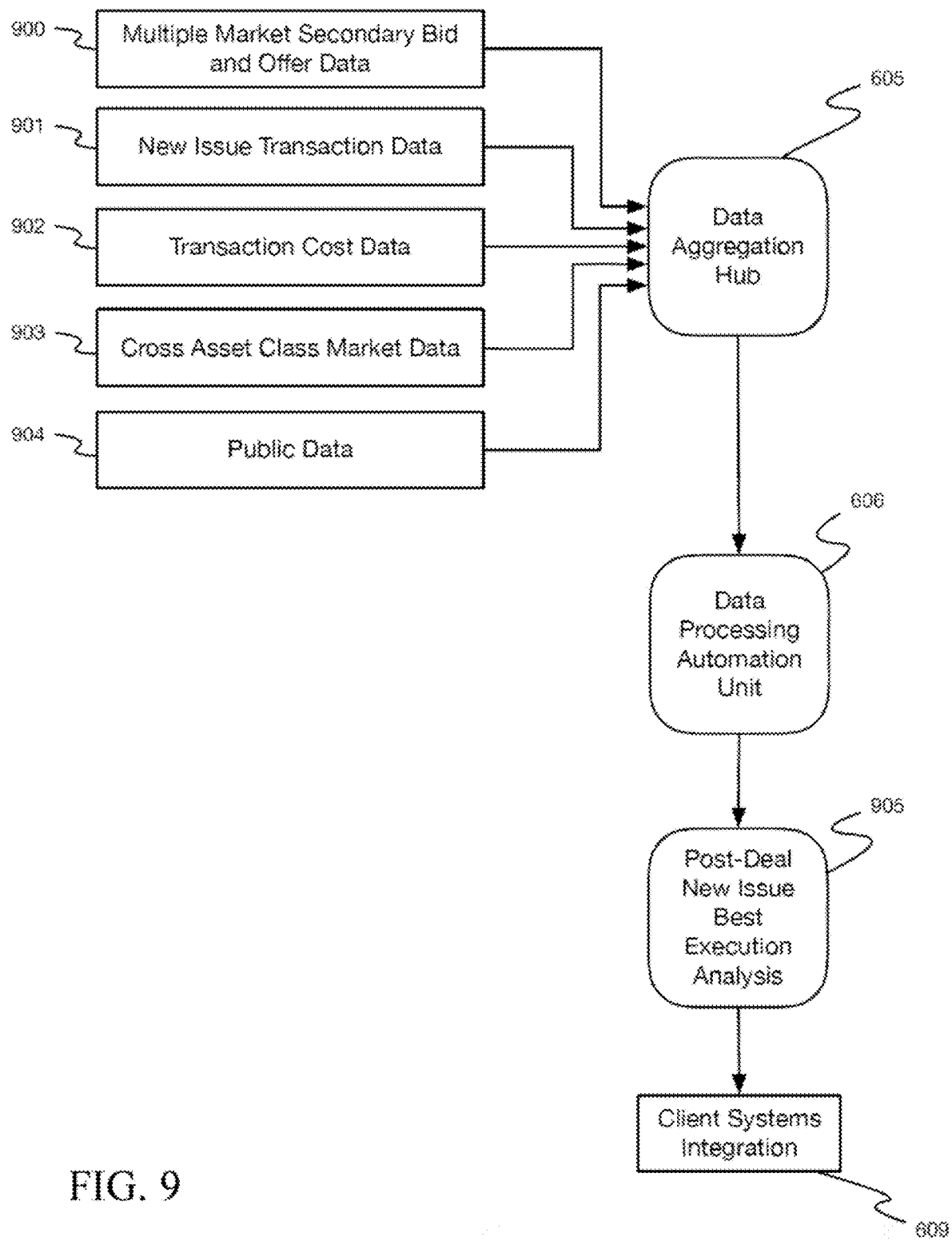
FIG. 9 shows an overview of customizable digital deal execution workflow with permission-controlled access provided to multiple stakeholders.

FIG. 9 is an overview of customizable digital deal execution 112 workflow with permission-controlled access provided to multiple stakeholders. Platform 10's Post-Deal Best Execution Analytics 905 provides reporting solutions that generate reports and metrics on specific new issue execution by taking into account multiple data points including Multiple Market Secondary Bid and Offer Data 900, New Issue Transaction Data 901, Transaction Cost Data 902, Cross Asset Class Market Data 903, and other Public Data 904. The Best Execution algorithm includes weighting on various pricing trends to identify useful statistics such as theoretical clearing pricing levels, optimal dealer selection, and optimal market timing. Further, the module provides regulatory compliance reports for a given new issue trade.

Figure 10:
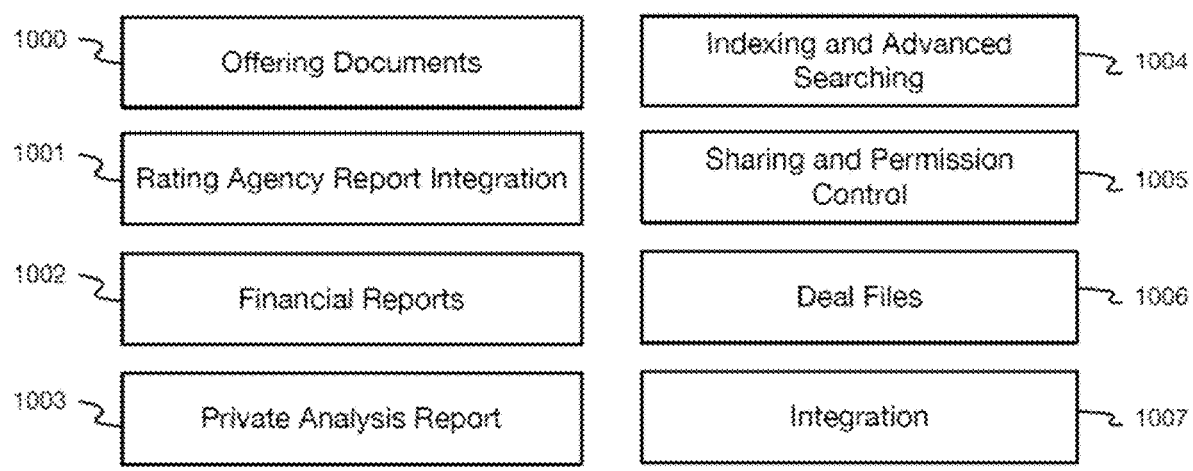
FIG. 10 shows a suite of tools available for users to manage multiple financial documents.

FIG. 10 is an integrated suite of tools that allow users to manage multiple financial documents 113 including Offering Documents 1000, Rating Agency Reports 1001, Financial Reports 1002, Private Analysis Reports 1003, and Deal Files 1006. The module may include complete indexing and searching capabilities 1004 to provide seamless access to relevant documents. The module leverages tools for financial documents that may be built on top of Apache Lucene® to provide real-time indexing and faceted search of all document contents. As well, access to documents are controlled through customizable Sharing and Permission Control 1005 protocol built into platform 10. Lastly, platform 10 enables multiple Integration 1007 capabilities for all modules. Such integration includes the following: integration with client-side servers, data integration with client-side servers via APIs, file backup protocols through client side server integration.

Figure 11:
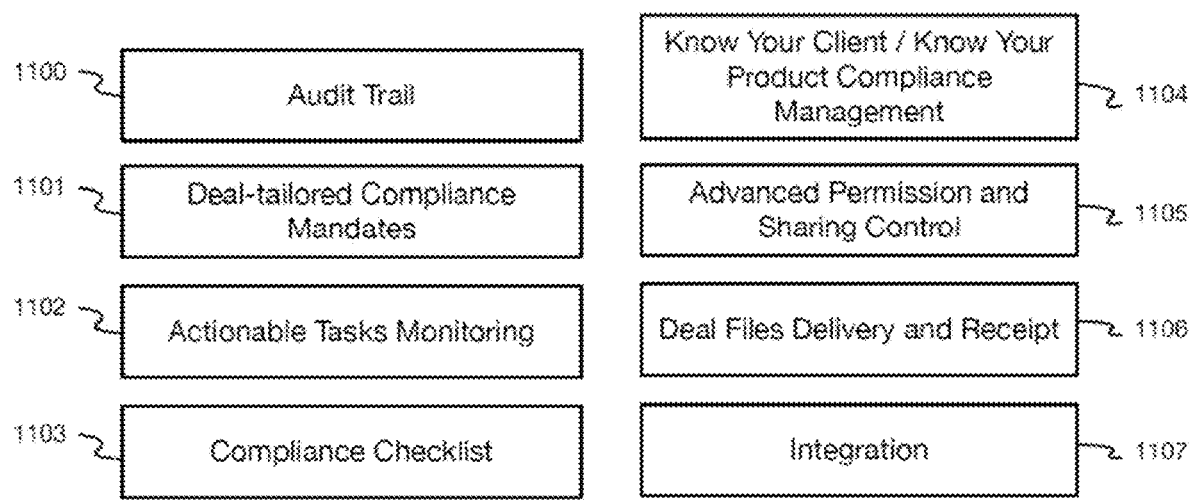
FIG. 11 shows a suite of tools available for users to comply with the relevant regulatory compliance requirements.

FIG. 11 is a suite of tools available for users to comply with the relevant regulatory compliance 114 requirements. The module is customizable to allow users to meet with relevant regulatory compliance and reporting mandates. These include complete Audit Trail 1100 of all user activities, built-in Deal-tailored Compliance Mandates 1101, Actionable Tasks Monitoring 1102, customizable Compliance Checklist 1103, and Know Your Client (KYC)/Know Your Product Compliance Management 1104, Advanced Permission Control 1105 and Data Files Delivery and Receipt 1106. The tool allows users to generate regulatory reports related to non-deal and deal-related activities of all user types. The invention may also contain direct Integration 1107 service with client-side servers.

Figure 12:
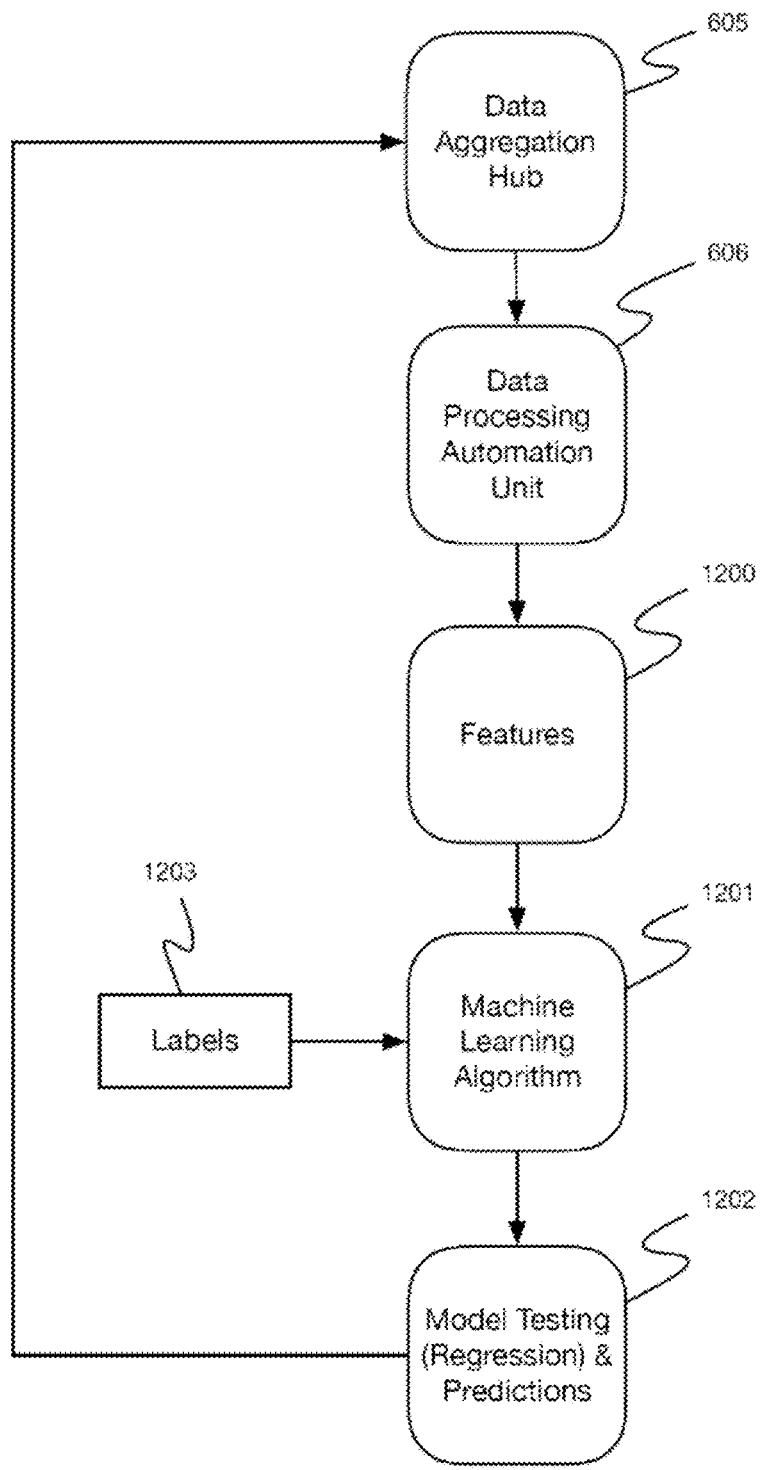
FIG. 12 shows an overview of continuous supervised machine learning process using regression models for the purpose of Digital New Issue Indication predictive analytics tool.

FIG. 12 depicts an overview of continuous supervised machine learning process according to an embodiment of the invention using regression models for the purpose of Digital New Issue Indication predictive analytics tool. Accordingly, as with the preceding descriptions in respect of FIGS. 1 to 11 platform 10 relies on abstract APIs and a data feed consuming pipeline capable of interoperating with multiple capital market feeds real-time. Market data is stored and cached, with millions of data points in a unified document architecture and platform 10 contains a corresponding database/document architecture and caching layer for the persistence of serving market data to internal application components. Internal application abstraction from market data feeds is achieved through an internal micro-services architecture. Accordingly, the process flow depicted exploits the Data Aggregation Hub 605 as described supra in respect of FIG. 6 which provides the Data Processing Automation Unit 606 with the data and supply information necessary for it to perform the required predictive analytics. Accordingly, Features 1200 defines the features of the regression sought and these together with the Labels 1203 are coupled to the Machine Learning Algorithm 1201 to generate the analytic algorithm between the features identified. Based upon the execution of the Machine Learning Algorithm 1201 the model is tested, for example through regression analysis, and exploited to make predictions with Model Testing (Regression) & Predictions Module 1202. At this point the output from the model testing and predictions are fed-back to the Data Aggregation Hub 605 allowing the process to iterate and exploit new data during these subsequent iterations.

Now referring to FIG. 13 there is depicted an overview of continuous supervised machine learning process according to an embodiment of the invention using regression models for the purpose of Digital New Issue Indication predictive analytics tool. Accordingly, as with the preceding descriptions in respect of FIGS. 1 to 12 platform 10 relies on APIs and a data feed consuming pipeline capable of interoperating with multiple capital market feeds real-time. Market data is stored and cached, with millions of data points in a unified document architecture and platform 10 contains a corresponding database/document architecture and caching layer for the persistence of serving market data to internal application components. Internal application abstraction from market data feeds is achieved through an internal microservices architecture. Accordingly, the process flow depicted exploits the Data Aggregation Hub 605 as described supra in respect of FIG. 6 which provides the Data Processing Automation Unit 606 with the data and supply information necessary for it to perform the required predictive analytics. Accordingly, Features 1300 defines the features of the regression sought and these together with the Labels 1303 are coupled to the Machine Learning Algorithm 1301 to generate the analytic algorithm between the features identified. Based upon the execution of the Machine Learning Algorithm 1301 the model is tested, for example through regression analysis, and exploited to make predictions with Model Testing (Classification) & Predictions Module 1302. At this point the output from the model testing and predictions are fed-back to the Data Aggregation Hub 605 allowing the process to iterate and exploit new data during these subsequent iterations.

Examples of models employed within the Machine Learning Algorithm 1201/1301 and as exploited for model testing, regression and predictions may include, but are not limited to, linear regression, polynomial regression, general linear model, generalized linear model, discrete choice, logistic regression, multinomial logit, mixed logit, probit, multinomial probit, Poisson, multilevel model, fixed and/or random effects, non-linear regression, non-parametric, semi-parametric, robust, quantile, isotonic, principal components, local segments, and errors-in-variables. Examples of estimation models employed within the Model Testing (Regression) & Predictions Module 1202/1302 and as exploited for model testing, regression and predictions include, but are not limited to, least squares, partial, total, generalized, weighted, non-linear, iteratively reweighted, ridge regression, least absolute deviations, Bayesian, and Bayesian multivariate.

Referring to FIG. 14 there is illustrated a table of financial data and rates as employed commonly within financial transactions and decision making. As depicted the table presents several standard factors, namely Maturity, Benchmark, Benchmark Yield, Re-Offer Spread, Re-Offer Yield, and Swapped Spread relative to US$ London Interbank Offered Rate (LIBOR). Against each of these are depicted different financial "products" which in this instance are different term US Treasury bonds for each of the selected maturity terms, namely 5 year, 10 year, and 30 year.

In one implementation, processor 14 may be embodied as a multi-core processor, a single core processor, or a combination of one or more multi-core processors and one or more single core processors. For example, processor 14 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, Application-Specific Standard Products (ASSPs), System-on-a-chip systems (SOCs), Complex Programmable Logic Devices (CPLDs), Programmable Logic Controllers (PLC), Graphics Processing Units (GPUs), and the like. For example, some or all of the device functionality or method sequences may be performed by one or more hardware logic components.

Memory 16 may be embodied as one or more volatile memory devices, one or more non-volatile memory devices, and/or a combination of one or more volatile memory devices and non-volatile memory devices. For example, memory 16 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY™ Disc), and semiconductor memories (such as mask ROM, PROM (programmable ROM), EPROM (erasable PROM), flash ROM, RAM (random access memory), etc.).

I/O module 18 is configured to facilitate provisioning of an output to a user of computing system 12 and/or for receiving an input from the user of computing system 12, and send/receive communications to/from the various sensors, components, and actuators of system 10. I/O module 18 is configured to be in communication with processor 14 and memory 16. Examples of the I/O module 18 include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a microphone, a speaker, a ringer, a vibrator, a light emitting diode display, a thin-film transistor (TFT) display, a liquid crystal display, an active-matrix organic light-emitting diode (AMOLED) display, and the like. In an example embodiment, processor 14 may include I/O circuitry configured to control at least some functions of one or more elements of I/O module 18, such as, for example, a speaker, a microphone, a display, and/or the like. Processor 14 and/or the I/O circuitry may be configured to control one or more functions of the one or more elements of I/O module 18 through computer program instructions, for example, software and/or firmware, stored on a memory, for example, the memory 16, and/or the like, accessible to the processor 14.

Communication interface 20 enables computing system 12 to communicate with other entities over various types of wired, wireless or combinations of wired and wireless networks, such as for example, the Internet. In at least one example embodiment, the communication interface 20 includes a transceiver circuitry configured to enable transmission and reception of data signals over the various types of communication networks. In some embodiments, communication interface 20 may include appropriate data compression and encoding mechanisms for securely transmitting and receiving data over the communication networks. Communication interface 20 facilitates communication between computing system 12 and I/O peripherals.

In an embodiment, various components of computing system 12, such as processor 14, memory 16, I/O module 18 and communication interface 20 may be configured to communicate with each other via or through a centralized circuit system 22. Centralized circuit system 22 may be various devices configured to, among other things, provide or enable communication between the components (14-20) of computing system 12. In certain embodiments, centralized circuit system 22 may be a central printed circuit board (PCB) such as a motherboard, a main board, a system board, or a logic board. Centralized circuit system 22 may also, or alternatively, include other printed circuit assemblies (PCAs) or communication channel media.

It is noted that various example embodiments as described herein may be implemented in a wide variety of devices, network configurations and applications.

Those of skill in the art will appreciate that other embodiments of the disclosure may be practiced in network computing environments with many types of computer system configurations, including personal computers (PCs), industrial PCs, desktop PCs), hand-held devices, multi-processor systems, microprocessor-based or programmable consumer electronics, network PCs, server computers, minicomputers, mainframe computers, and the like. Accordingly, system 10 may be coupled to these external devices via the communication, such that system 10 is controllable remotely. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In another implementation, system 10 follows a cloud computing model, by providing an on-demand network access to a shared pool of configurable computing resources (e.g., servers, storage, applications, and/or services) that can be rapidly provisioned and released with minimal or nor resource management effort, including interaction with a service provider, by a user (operator of a thin client).

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Thus, the preceding detailed description is presented for purposes of illustration only and not of limitation, and the scope of the invention is defined by the preceding description, and with respect to the attached claims.

The invention claimed is:

1. A computer-implemented method comprising a processor and a memory, the method comprising the operations of:

receiving, by the processor, raw data in a plurality of disparate formats using a set of rules;

scrubbing, by the processor, the raw data for anomalies and null values and generating a structured data set;

extracting, by the processor, a first feature vector set from the structured data set for input into a machine learning architecture comprising at least one of a XGBoost algorithm, a neural network, a random forest, and a logistic regression model;

generating, by the processor, a first machine learning model using the first feature vector set, wherein the first machine learning model is iteratively trained to predict a plurality of risk values related to credit pricing until an accuracy rate of the predicted plurality of risk values meets a set of thresholds; and determining, by the processor, a relative value pricing curve for a financial instrument and a price of the financial instrument within a time frame by monitoring, by the processor, a secondary market trading activity and determining, by the processor, a liquidity of a currency for the pricing curves and a list of liquid issuers to identify the list of liquid issuers related to a liquid trading pattern;

implementing, by the processor, a K-Nearest Neighbors algorithm to generate indicative new issue pricing curves for illiquid issuers with illiquid or insufficient secondary trading activity in the currency with active trading; and outputting, by the processor, relative value pricing curves for the illiquid issuers; and determining, by the processor, an optimal curve shape, limiting curve distortions and pricing aberrations;

monitoring, by the processor, the credit pricing in a plurality of currencies and monitoring, by the processor, a cost of swapping proceeds between currencies, and applying, by the processor, the first machine learning model to minimize a credit pricing risk;

extracting, by the processor, a second feature vector set for input into the machine learning architecture;

generating, by the processor, a second machine learning model using the second feature vector set, wherein the second machine learning model is iteratively trained to predict a plurality of propensity scores related to an issuance of the financial instrument until the accuracy of the predicted plurality of propensity scores meets the set of thresholds, and to predict a time horizon for the issuance of the financial instrument;

applying, by the processor, the second machine learning model to identify a fixed income market opportunity, wherein the fixed income market opportunity comprises the financial instrument, and providing, by the processor, pre-issuance insights into the fixed income market opportunity;

extracting, by the processor a third feature vector set for input into the machine learning architecture;

generating, by the processor, a third machine learning model using the third feature vector set, wherein the third machine learning model is iteratively trained to predict the plurality of risk values related to a target institutional buyer until the accuracy of the predicted plurality of risk values meets the set of thresholds; and applying, by the processor, the third machine learning model to rank the target institutional buyer depending on a likelihood of the target institutional buyer investing in the financial instrument; and matching, by the processor, the target institutional buyer with the fixed income market opportunity;

displaying, by the processor, on a user interface a plurality of user-selectable criteria comprising time thresholds pertaining to historical data, contemporaneous data, a sector, a tenor, a bond rating, a model preference, a confidence level and a liquidity score; and displaying, by the processor, on the user interface the plurality of user-selectable criteria, with selection indicators received by the processor to forecast the price of the financial instrument, the time horizon for the issuance of the financial instrument, issuance propensity for the financial instrument, the confidence level and the liquidity score related to the forecast.

2. The method of claim 1, wherein the processor matches the target institutional buyer with the financial instrument issuance based on past buying patterns, portfolio manager preferences, rebalancing events or preferred industry sector, a ranking of the target institutional buyer or the tenor.

3. The method of claim 1, wherein the processor analyzes historical buying patterns to identify traditional and non-traditional investors for the fixed income market opportunity.

4. The method of claim 1, wherein the predictive time horizon ranges from 4 to 6 weeks.

5. The method of claim 2, wherein the plurality of propensity scores is assigned, by the processor, for each company in each potential financial instrument issuance tenor and for each currency.

6. A computer system comprising a processor and a memory device storing executable instructions that when executed by the processor cause the processor to perform the operations comprising:

receiving raw data in a plurality of disparate formats and using rules, scrub the raw data for anomalies and null values and generating a structured data set;

extracting a first feature vector set from the structured data set for input into a machine learning architecture comprising at least one of a XGBoost algorithm, a neural network, a random forest, and a logistic regression model;

generating a first machine learning model iteratively trained to predict a plurality of risk values associated with credit pricing until an accuracy of the predicted plurality of risk values meets a set of thresholds and monitoring a credit pricing in a plurality of currencies and monitoring a cost of swapping proceeds from a first currency to a second currency, and applying the first machine learning model to minimize a credit pricing risk;

extracting a second feature vector set for input into the machine learning architecture;

generating a second machine learning model using the second feature vector set, wherein the second machine learning model is iteratively trained to predict a plurality of propensity scores associated with issuance of a financial instrument until an accuracy of the predicted plurality of one or more propensity scores meets the set of thresholds and, applying the second machine learning model to identify a fixed income market opportunity, wherein the fixed income market opportunity comprises the financial instrument, and provide pre-issuance insights into the fixed income market;

extracting a third feature vector set for input into the machine learning architecture;

generating a third machine learning model using the third feature vector set, wherein the third machine learning model is iteratively trained to predict a plurality of risk values associated with a target institutional buyer until the accuracy of the predicted plurality of risk values meets the set thresholds, and applying the third machine learning model to rank the target institutional buyer depending on the likelihood of the target institutional buyer investing in the financial instrument; and matching the target institutional buyer with the fixed income market opportunity;

displaying on a user interface a plurality of user-selectable criteria comprising time thresholds pertaining to historical data, contemporaneous data, a sector, a tenor, a bond rating, a model preference, a confidence level and a liquidity score; and displaying on the user interface the plurality of user-selectable criteria with selection indicators received by the processor to execute the instructions to forecast the pricing of the financial instrument, a time frame for an issuance of the financial instrument, the issuance propensity for the financial instrument, the confidence level and the liquidity score related to the forecast.

7. The computer system of claim 6, wherein the neural network comprises bidirectional long short-term memory (BLSTM) neural network architecture.

8. The computer system of claim 6, wherein the processor receives the raw data from a plurality of data sources comprising contemporaneous trading data and fundamental data covering a series of time periods and aspects of quantitative investing and market monitoring.

9. The computer system of claim 6, wherein the models are Applied to complete tasks comprising managing trading activities, managing risk, making portfolio funding allocations, predicting a time horizon for issuance of the financial instrument; predicting an issuer of the financial instrument within the predicted time horizon; predicting the price of the financial instrument, matching a buyer with the financial instrument, and combinations thereof.

* * * * *